(12) United States Patent
Wang et al.

(10) Patent No.: US 11,428,325 B2
(45) Date of Patent: Aug. 30, 2022

(54) ROTATABLE VALVE AND ACTUATOR

(71) Applicants: BS&B Innovations Limited, Limerick (IE); Zhanggang Wang, Haslett, MI (US); Tiago Martins De Freitas, Limerick City (IE)

(72) Inventors: Zhanggang Wang, Haslett, MI (US); Tiago Martins De Freitas, Limerick City (IE)

(73) Assignee: BS&B Innovations Limited, Limerick (IE)

(*) Notice: Subject to any disclaimer, the term of this patent is extended or adjusted under 35 U.S.C. 154(b) by 0 days.

(21) Appl. No.: 15/733,727

(22) PCT Filed: Apr. 8, 2019

(86) PCT No.: PCT/US2019/026320
§ 371 (c)(1),
(2) Date: Oct. 6, 2020

(87) PCT Pub. No.: WO2019/195831
PCT Pub. Date: Oct. 10, 2019

(65) Prior Publication Data
US 2021/0156481 A1    May 27, 2021

Related U.S. Application Data

(60) Provisional application No. 62/773,309, filed on Nov. 30, 2018, provisional application No. 62/654,063, filed on Apr. 6, 2018.

(51) Int. Cl.
*F16K 17/40* (2006.01)
*F16K 1/22* (2006.01)
(Continued)

(52) U.S. Cl.
CPC ............ *F16K 1/221* (2013.01); *F16K 17/406* (2013.01); *F16K 31/1655* (2013.01); *F16K 31/365* (2013.01); *F16K 31/563* (2013.01)

(58) Field of Classification Search
CPC .. F16K 17/406; F16K 31/365; F16K 31/1655; F16K 31/563; F16K 1/221
See application file for complete search history.

(56) References Cited

U.S. PATENT DOCUMENTS 2,399,938 A    5/1946    Pett
2,738,771 A    3/1956    Rosenberger
(Continued)

FOREIGN PATENT DOCUMENTS

| EP | 1 721 828 | 11/2006 |
|---|---|---|
| WO | WO 1999/42753 | 8/1999 |
| WO | WO 2017/076370 | 5/2017 |

OTHER PUBLICATIONS

International Search Report in corresponding PCT Application No. PCT/US2018/033616 dated Jun. 28, 2019 (5 pages).
(Continued)

*Primary Examiner* — Umashankar Venkatesan
(74) *Attorney, Agent, or Firm* — Finnegan, Henderson, Farabow, Garrett & Dunner, LLP

(57) ABSTRACT

A rotatable pressure relief valve assembly is provided. The assembly may comprise a butterfly valve, a spring actuator, and a diaphragm device having a flexible membrane. A linkage assembly may be provided with a first end and a second end, wherein the first end may be configured to engage with a terminal end of a piston of a spring actuator, and wherein the second end may be configured to engage with a latch arm of the diaphragm device. A pilot tube may be configured to transmit an inlet fluid pressure from the inlet side of the butterfly valve to the sealed chamber. The assembly may further comprise a buckling pin mechanism
(Continued)

having a buckling pin. The diaphragm device may be configured to translate the inlet fluid pressure into a compressive force and to transmit the compressive force to the buckling pin, and the latch arm may be configured to disengage from the second end of the linkage assembly when the buckling pin has buckled.

6 Claims, 30 Drawing Sheets

(51) Int. Cl.
    *F16K 31/165*     (2006.01)
    *F16K 31/365*     (2006.01)
    *F16K 31/56*     (2006.01)

(56) References Cited

U.S. PATENT DOCUMENTS

| | | | |
|---|---|---|---|
| 3,650,506 A | 3/1972 | Bruton | |
| 5,146,942 A | 9/1992 | Taylor | |
| 6,325,088 B1 | 4/2001 | Scantlin | |
| 8,915,260 B2 | 12/2014 | Klein | |
| 2003/0221719 A1* | 12/2003 | Taylor | F16K 17/14 137/68.11 |

OTHER PUBLICATIONS

Written Opinion of the International Searching Authority in corresponding PCT Application No. PCT/US2018/033616 dated Oct. 10, 2019 (7 pages).

\* cited by examiner

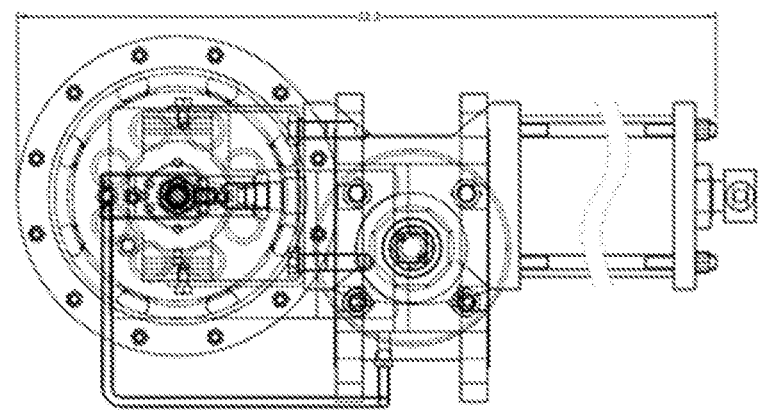
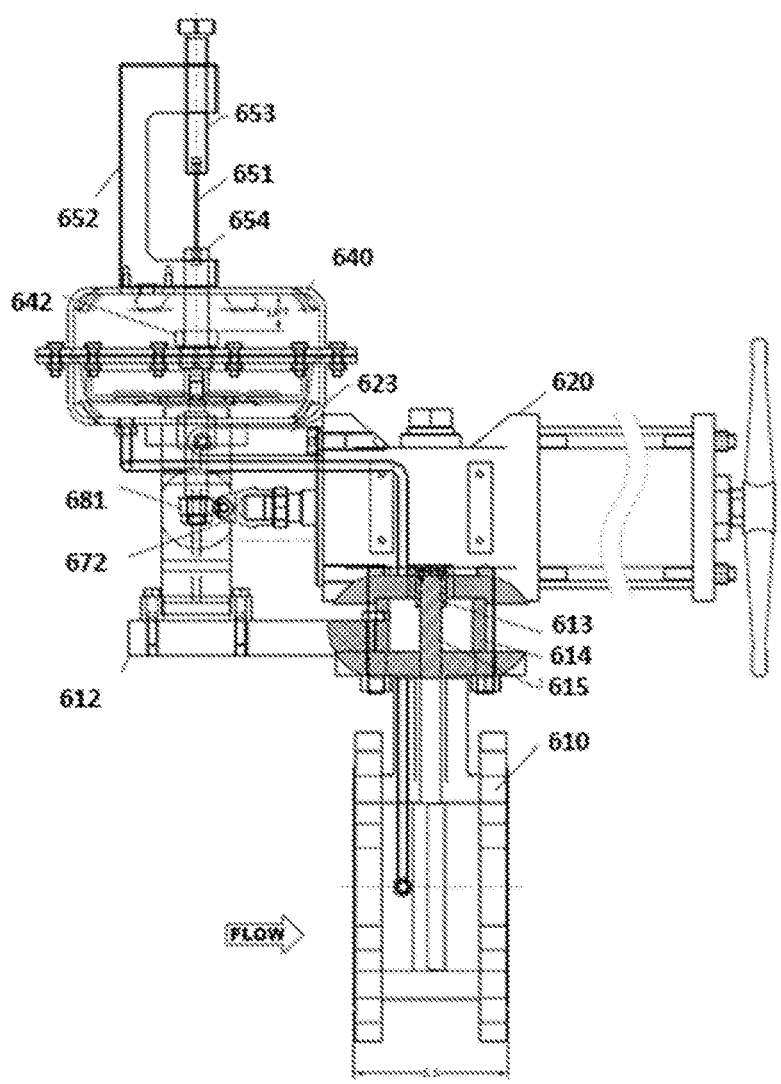
FIG. 7A

ROTATABLE VALVE AND ACTUATOR

CROSS-REFERENCE TO RELATED PATENT APPLICATIONS

This is a National Phase of International Application No. PCT/US2019/026320, filed Apr. 8, 2019, which claims the benefit of U.S. Provisional Application Nos. 62/654,063 filed Apr. 6, 2018, and 62/773,309 filed Nov. 30, 2018. The entire contents of the above-referenced applications are expressly incorporated herein by reference.

FIELD

The present disclosure relates to a system for relieving pressure from a pressurized system. More particularly, the disclosure relates to a rotatable valve assembly that may be used to relieve pressure, an actuator device for use with a pressure-relieving valve, and assemblies including such a valve assembly and/or actuator device.

There are many types of systems that process or use a pressurized fluid. To ensure the safety of these types of systems, each such system typically includes a safety device designed to prevent the over-pressurization of the system. In an emergency situation, where the fluid in the system reaches an unsafe level, the high pressure of the fluid acts on the safety device to create an opening to release fluid from the system. Venting fluid to the environment or a safety reservoir through the opening reduces the pressure in the system and prevents the system from failing due to the high pressure of the fluid.

One type of safety device for a pressurized system is a pressure relief valve, which may be a reclosing valve or a non-reclosing valve. A pressure relief valve may include a release mechanism, which may include a spring, a pin, or a combination of a spring and pin, and which is used to hold a moving plug in sealing engagement with the body or housing of the device while connected to the pressurized system. When the pressure of the fluid reaches the predetermined safety level in such systems, the force exerted on the plug by the pressurized fluid overcomes the bias of the spring or exceeds the resistance of the pin that holds the plug in place. When either of these events occurs, the pressurized fluid moves the plug to expose an opening through which fluid may escape to relieve the pressure in the system. Reclosing valves will automatically reset once the pressurized fluid at the inlet of the device has reduced sufficiently for the spring or other mechanism to reseat the plug. Non-reclosing valves require that the device be manually reset so that the valve plug is re-engaged with the seal and, if necessary, the pin or other expendable component replaced.

One type of pressure relief valve is a rotatable valve assembly. Known rotatable valve assemblies are disclosed in commonly owned U.S. Pat. Nos. 5,607,140, 5,947,445, 6,098,495, 6,367,498, 6,488,044, and 6,491,055, the entire contents of each of which are expressly incorporated herein by reference. A rotatable valve includes a plug that is mounted on a rotatable shaft and may be rotated between a closed position where the plug blocks the flow of fluid and an open position where the plug allows fluid to flow through the valve. The rotation of the plug to the open position may be initiated manually or by another external force. Alternatively, the plug may be mounted on the shaft so that the rotational axis of the plug is offset relative to the center of the plug, so that the pressurized fluid exerts a torque on the shaft and urges the plug to rotate. A device may be coupled to the shaft to prevent the shaft from rotating until the torque on the shaft reaches a certain level, indicating that the pressure of the fluid has reached an over-pressure situation. At that point, the shaft is released and the plug rotates to open the valve and vent the system.

One type of rotatable valve is known as a butterfly valve. Typically, a standard butterfly valve requires a significant force/torque to maintain the valve in a closed position, whether the valve is provided with a soft seat or a hard seat arrangement. This force/torque may be provided by a spring actuator, which may be latched in a fixed position during valve calibration and normal system operating conditions. When the buckling pin trigger functions due to a predetermined system pressure condition, the spring force is released to open the butterfly valve. One type of butterfly valve uses an offset shaft. When an offset shaft is used, the process pressure may provide assistance in rotating the valve open.

In a typical pressure relief valve using a buckling pin as part of the release mechanism, pressure acting on the valve plug is transmitted from the valve plug to the buckling pin as a mechanically transmitted force. Typically, the force is transmitted via a linkage of one or more mechanical components from the plug to the buckling pin. The present disclosure recognizes that it may be advantageous to provide a new valve release mechanism that does not depend on receiving a mechanical force transmitted from the valve plug.

SUMMARY

In one embodiment, a rotatable pressure relief valve assembly may comprise a butterfly valve having an inlet side and an outlet side; a spring actuator having a piston, wherein the piston terminates in a terminal end; a diaphragm device having a flexible membrane, wherein the flexible membrane creates a pneumatically sealed chamber within the diaphragm device, the diaphragm device further having a latch arm. A linkage assembly may be provided with a first end and a second end, wherein the first end is configured to engage with the terminal end of the piston, and wherein the second end is configured to engage with the latch arm. A pilot tube may be configured to transmit an inlet fluid pressure from the inlet side of the butterfly valve to the sealed chamber. The assembly may further comprise a buckling pin mechanism having a buckling pin, wherein the diaphragm device is configured to translate the inlet fluid pressure into a compressive force and to transmit the compressive force to the buckling pin, and wherein the latch arm is configured to disengage from the second end of the linkage assembly when the buckling pin has buckled.

BRIEF DESCRIPTION OF THE DRAWINGS

The accompanying drawings, which are incorporated in and constitute a part of this specification, illustrate several embodiments and together with the description, serve to explain the principles of the disclosure.

FIGS. 6A-7B illustrate an embodiment of a pressure relief device assembly, including a cross-sectional view of a diaphragm device.

DESCRIPTION OF THE EMBODIMENTS

Figure 1:
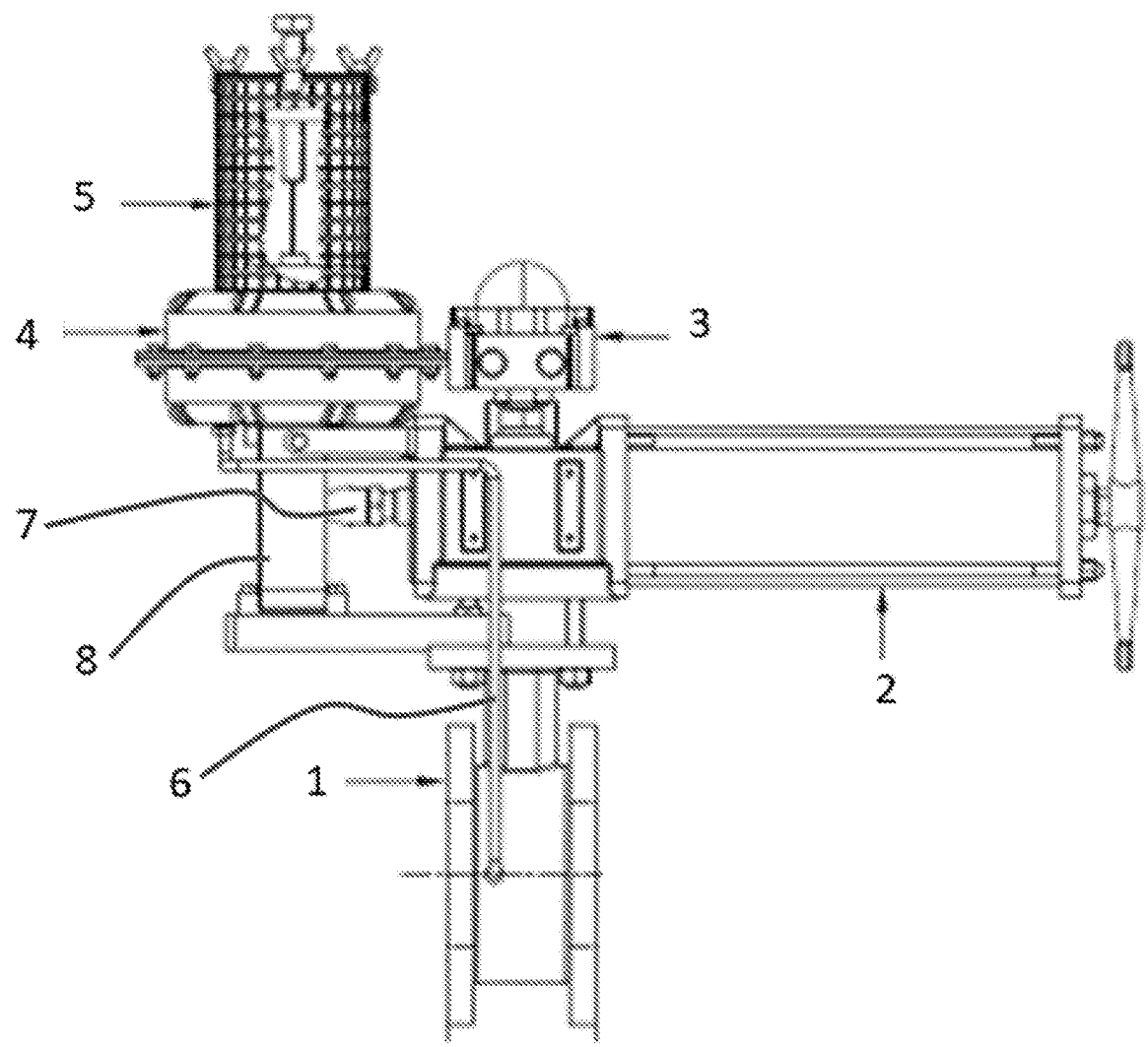
FIG. 1 illustrates a pressure relief device assembly, showing a partially cut away view of a buckling pin device.

Reference will now be made in detail to the present exemplary embodiments, examples of which are illustrated in the accompanying drawings. Wherever possible, the same reference numbers will be used throughout the drawings to refer to the same or like parts. The drawing figures of this application are intended to provide a general understanding of the working elements of the underlying system. Accordingly, unless explicitly stated, the figures do not represent a literal depiction of proportional dimensions or the precise locations for the illustrated inter-related components.

Figure 2:
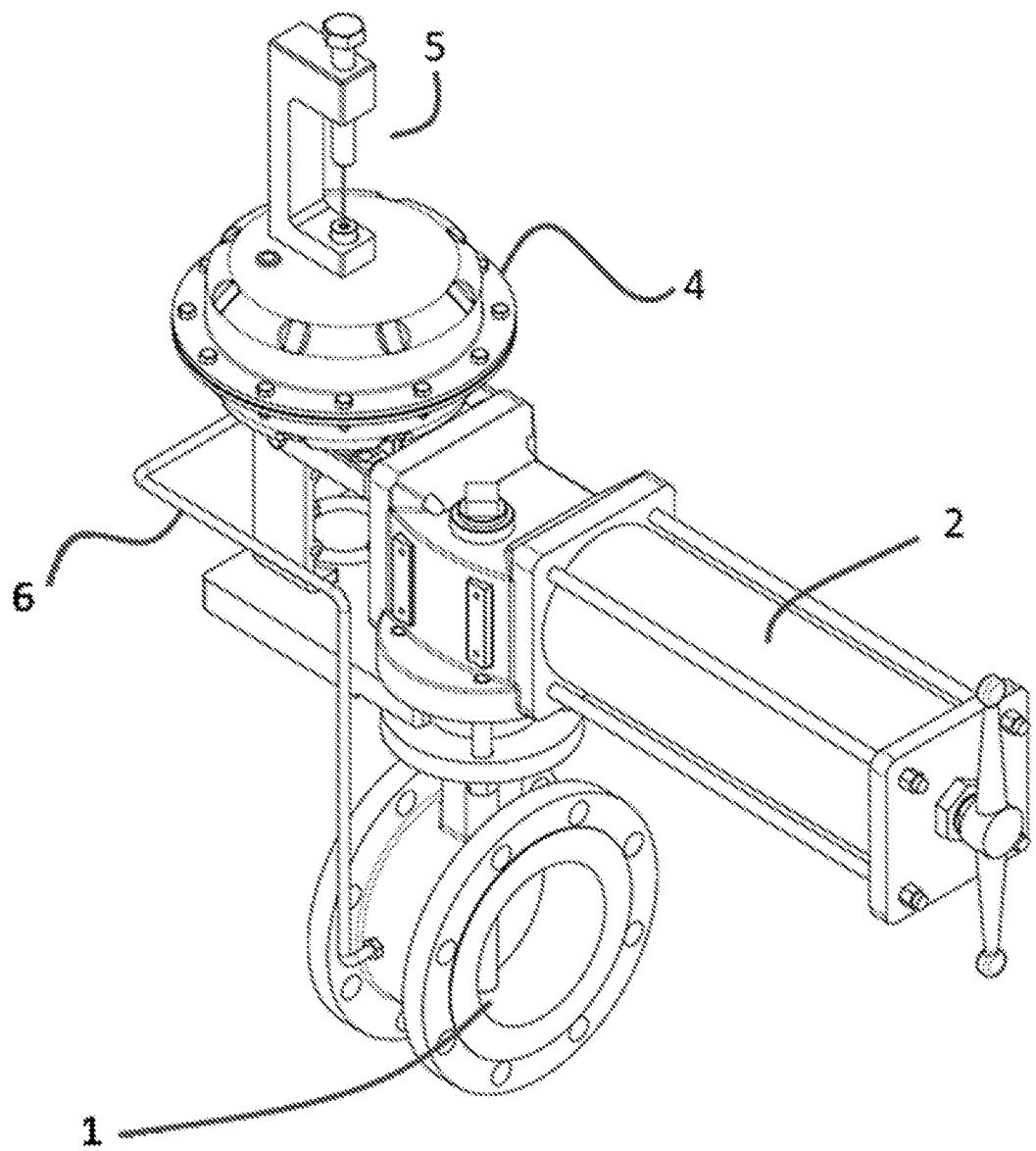
FIG. 2 illustrates a perspective view of another embodiment of a pressure relief device assembly.

FIGS. 1 and 2 illustrate embodiments of a pressure relief device assembly of the present disclosure. The assembly includes a butterfly valve (1), a spring actuator (2) having a piston rod that terminates in a roller (7), a position indicator (open/closed) (3), a diaphragm device (4), and a buckling pin mechanism (5). Also illustrated in FIGS. 1 and 2 is a pilot tube (6), which is configured to transmit pressure from the inlet side of the butterfly valve (1) to the diaphragm device. Further illustrated in FIGS. 1 and 2 is an actuator latch, which includes a latch arm (8) that cooperates with the roller (7) to keep a spring in the spring actuator (2) compressed and the butterfly valve (1) closed during normal operation. As will be discussed in more detail below, when an inlet pressure reaches a predetermined level (e.g., the "set pressure" of the valve), a diaphragm or flexible membrane within the diaphragm device (4) is forced upward, causing a buckling pin within the buckling pin mechanism (5) to activate/fail. Movement of the diaphragm causes the latch arm (8) to move upward out of contact with the roller (7). As a result, the spring in the spring actuator (2) is allowed to decompress, causing rotation (e.g., 90-degrees) and opening of the butterfly valve (1).

Figure 3:
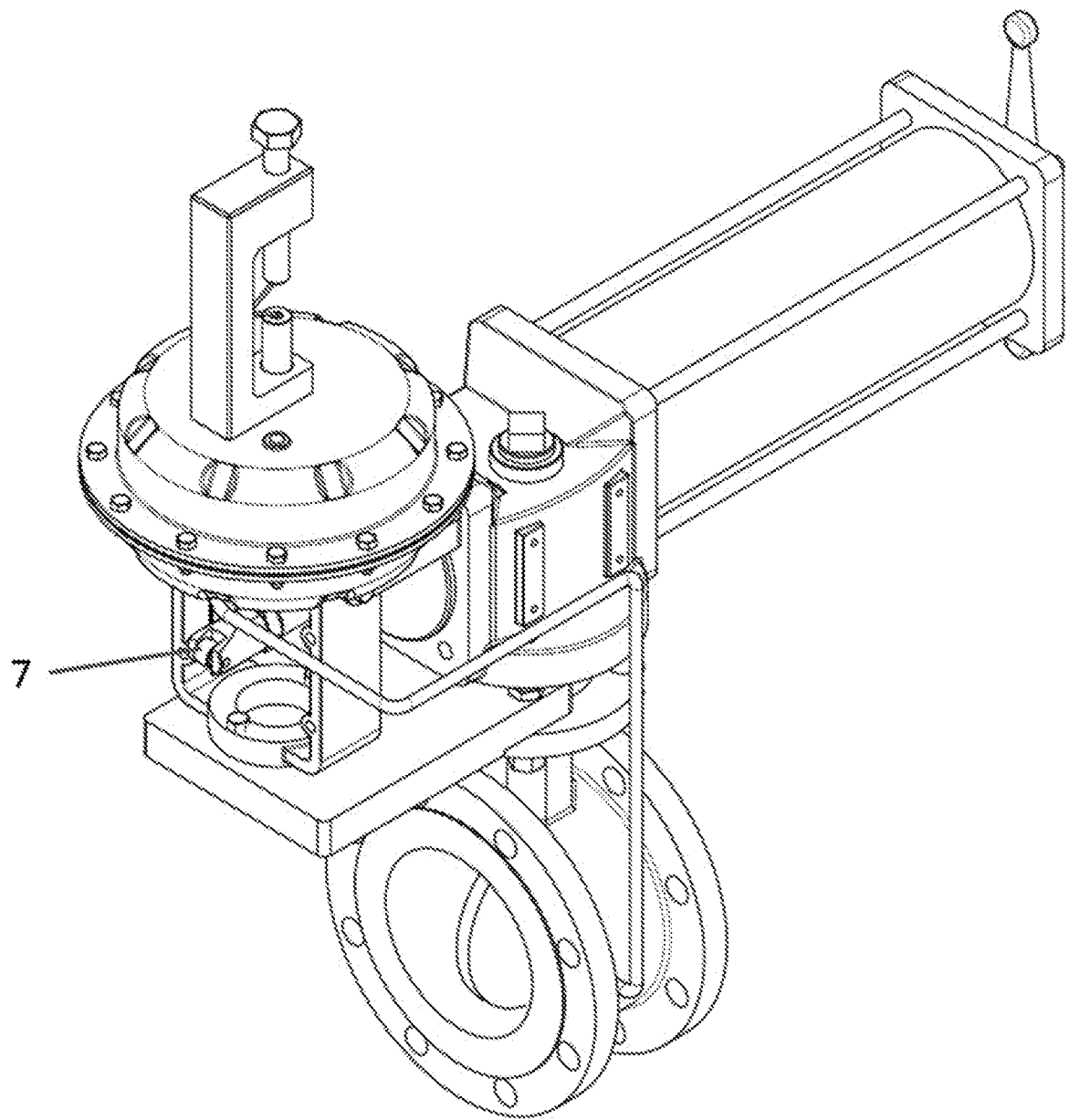
FIGS. 3-5 illustrate perspective view of further embodiments of a pressure relief device assembly, showing a buckling pin in a buckled state and a valve in an "open" position.
Figure 4:
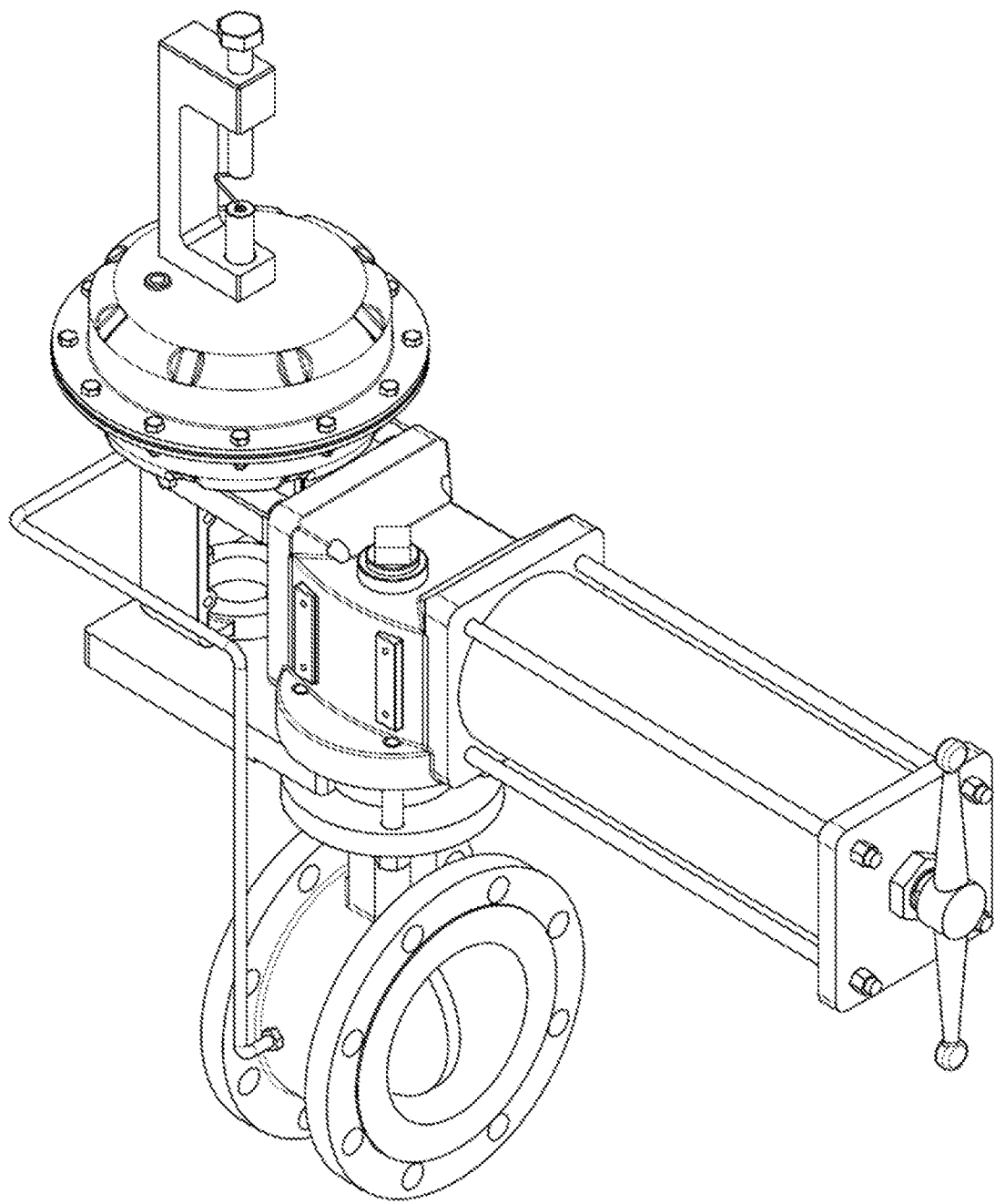
Figure 5:
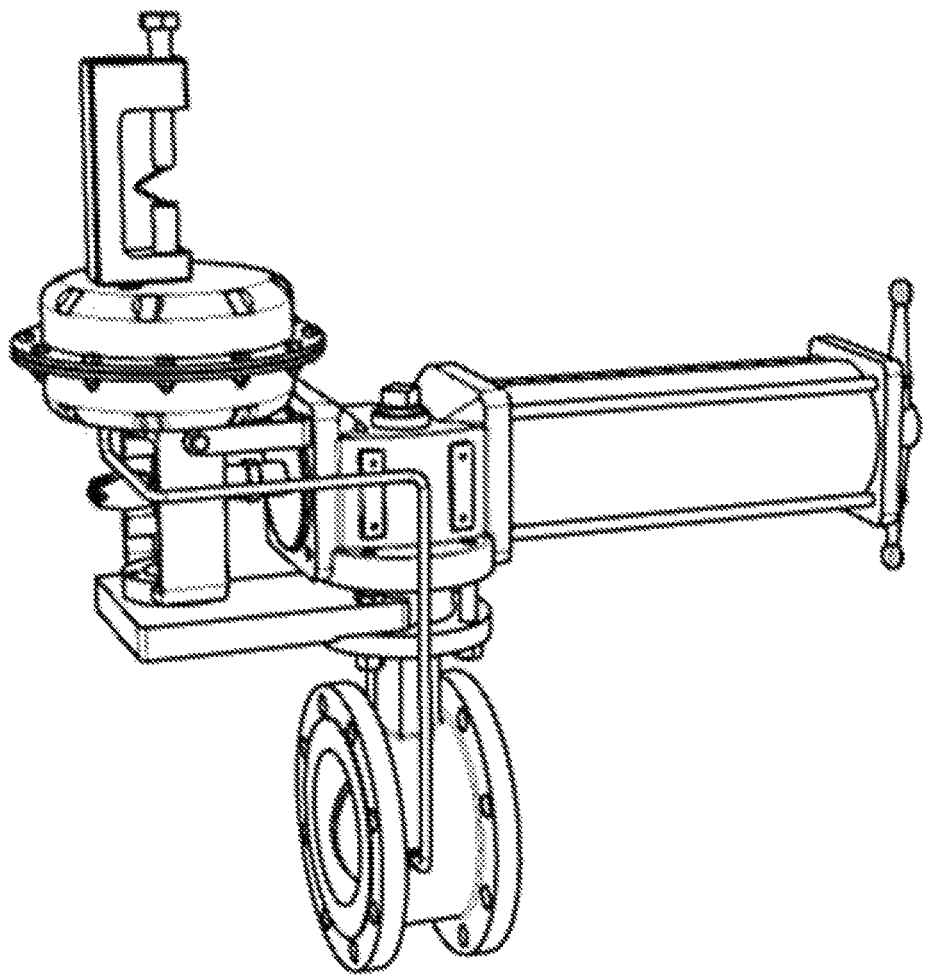

FIGS. 3, 4, and 5 provide additional depictions of a pressure relief device assembly of the present disclosure. As illustrated in FIGS. 3, 4, and 5, the buckling pin has buckled, allowing the release of the latch and spring-loaded actuator, and allowing the butterfly valve to rotate into the open configuration.

Figure 6A:
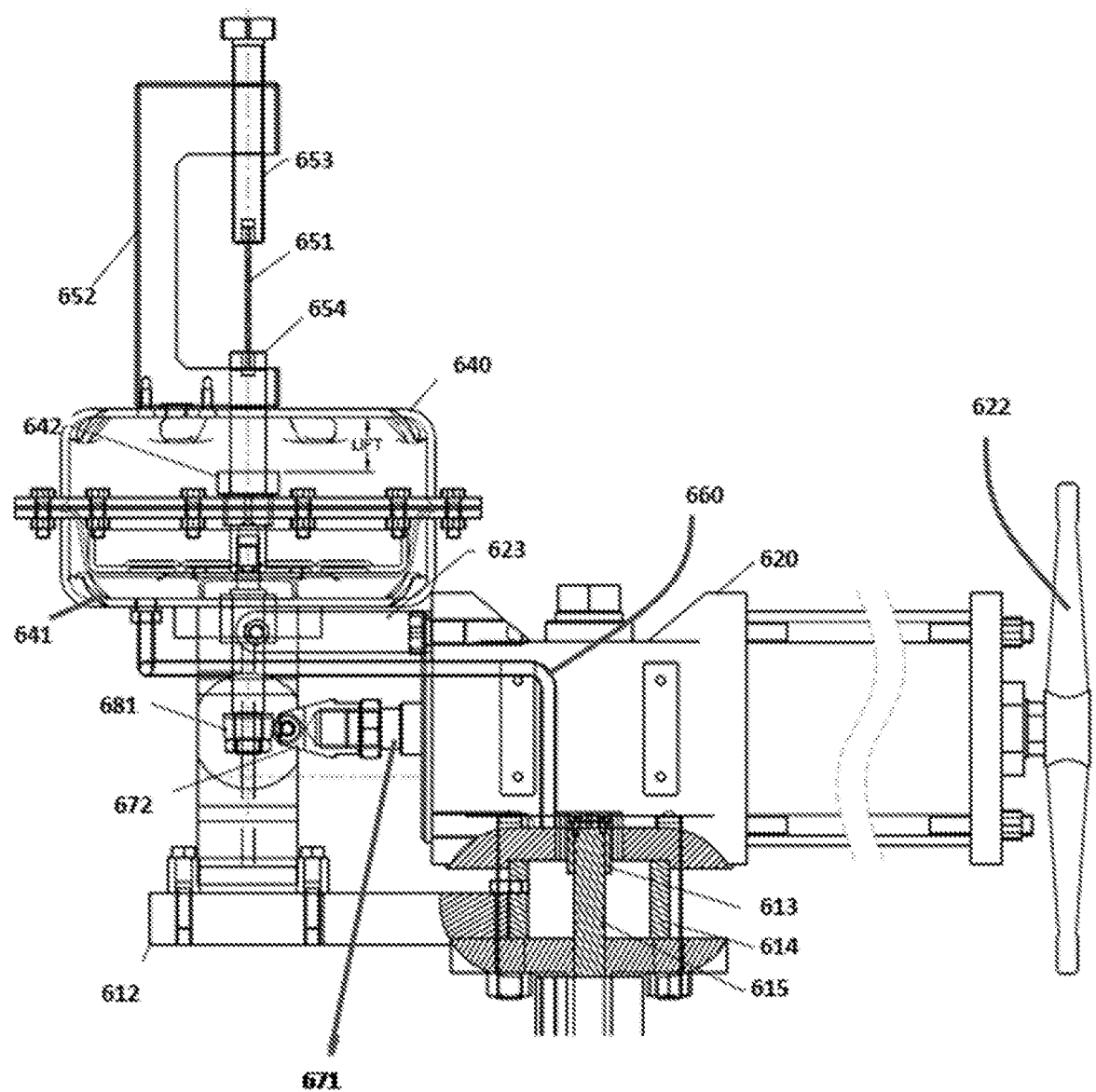
Figure 6B:
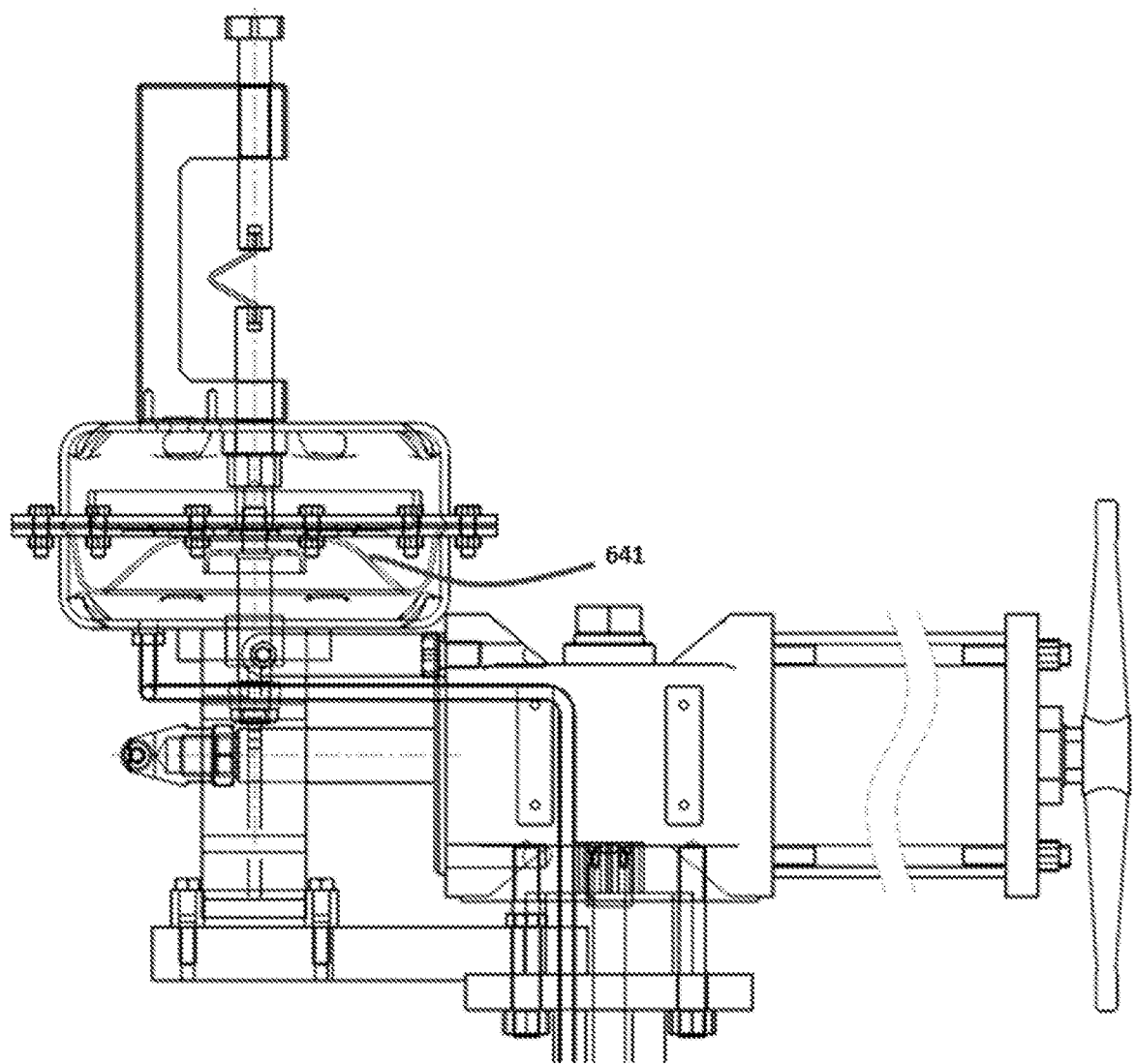
Figure 7B:
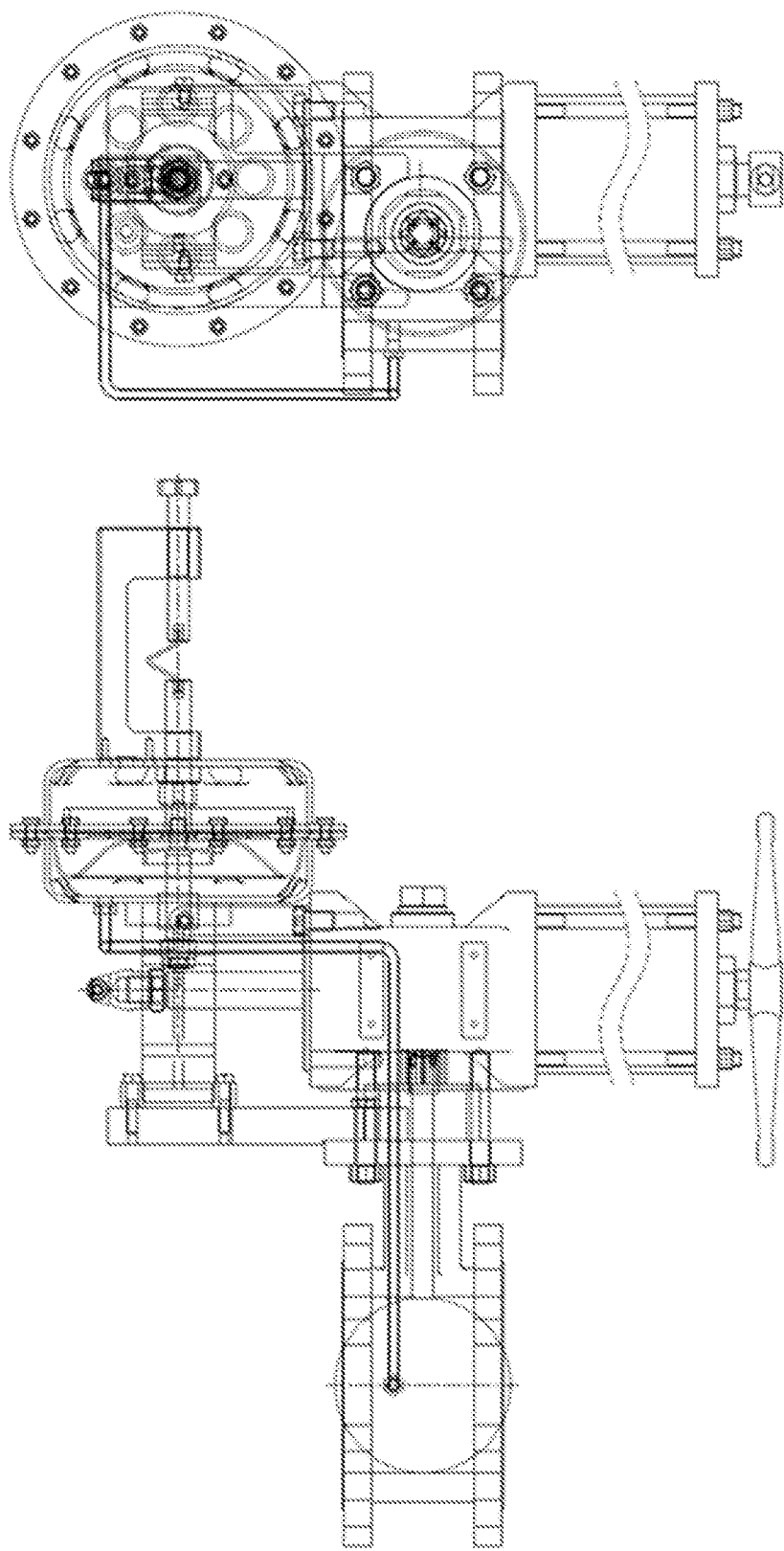

The operation of a diaphragm device, spring actuator, and latching mechanism according to the present disclosure is illustrated in FIGS. 6A and 6B. In FIG. 6A, the pressure relief device assembly is depicted in its normally operating closed state. In FIG. 6A, the assembly is depicted in an open condition.

As illustrated in FIG. 6A, a diaphragm device (640) may include an internal diaphragm or flexible membrane (641). A diaphragm device (640) may mount to the body of a butterfly valve via a mounting plate (612). The flexible membrane (641) may have a perimeter that may be fixed to the surrounding diaphragm device housing, thereby creating a pneumatically sealed chamber. Toward the center of the membrane may be affixed a latch arm, which may terminate in a cone bushing (681), which extends downward and may be configured to move with the membrane, in a direction generally perpendicular to the plane of the membrane. Also toward the center of the membrane, the top surface of the membrane may be engaged with a force-transmission member, such as a piston (642), which may be configured to transmit force from the membrane to the buckling pin (651). The buckling pin (651) may be held in place between an upper pin holder in an adjuster screw (653) and a lower pin holder (654), which may be part of the piston (642). The adjuster screw may be set within a pin assembly bracket (652).

Also shown in FIG. 6A is a spring actuator (620), which includes a compressed spring (not shown in FIG. 6A). The spring actuator may connect with the diaphragm device by one more more supporting arms (623). The spring may be compressed by use of a spring setting handle (622), thereby allowing adjustment of the pre-loaded spring force. In one embodiment, the spring setting handle may be wire-sealed to discourage/prevent tampering after the desired setting has been applied. A piston rod (671) extends outwardly from the spring actuator, terminating in an actuator head having a roller (672). As illustrated, the spring actuator engages with the latch arm by way of the roller (672). Specifically, the compressed spring forces the roller (672) into engagement with a cone bushing (681) mounted on the latch arm. The roller (672) may be configured to freely rotate within the actuator head, and thereby minimize or avoid exerting frictional forces on the cone bushing (681). Accordingly, when the latch arm is moved upward upon opening of the valve (as shown in FIG. 6B, discussed below), the latch arm will encounter little or no significant resistance from the roller. Further, the axis of movement of the rigid member is typically at right angles to the actuator piston, thereby causing no part of the forces present in the actuator piston to be transmitted to the buckling pin. The cone bushing and actuator head of FIG. 6A are illustrated in greater detail in FIG. 8A. FIG. 9 provides an additional view of a spring actuator according to the present disclosure.

Turning to operation of the embodiment of FIG. 6A, a pilot tube 660 is configured to transmit system pressure from the inlet side of a butterfly valve into the pneumatically sealed chamber within the diaphragm device. Pressure on the diaphragm device is translated into a force, which is transmitted via the force transmitting member to the buckling pin. When a predetermined set pressure is reached, the force on the buckling pin causes the buckling pin to break, allowing the diaphragm to move upward into the configuration illustrated in FIG. 6B.

As illustrated in FIG. 6B, the latch arm and the force-transmission member have moved upward with the diaphragm in response to the buckling of the buckling pin. As shown, the upward movement of the latch arm has caused it to disengage from the roller, thereby allowing the spring actuator to release. Releasing the spring actuator, in turn, has caused (or at least allowed) a butterfly valve shaft to rotate the butterfly valve plug into the open position. The cone bushing and actuator head of FIG. 6B, in the open condition, are illustrated in greater detail in FIG. 8B.

As illustrated in FIGS. 6A and 6B, the diaphragm device may act as a force multiplier in response to pressures transmitted by the pilot tube. That is, the internal flexible membrane of the diaphragm device may be configured to have an area much larger than the cross-section of the pilot tube. In such a manner, the pressure communicated from the pilot tube into the pneumatically sealed chamber may be translated into a concentrated force acting on the buckling pin.

The description of one exemplary embodiment may demonstrate the diaphragm device's ability to act as a force multiplier. In the exemplary embodiment, a pilot tube may be provided having a cross-sectional area of 1-square inch, and the diaphragm may be provided with a free area of 10 square inches. Assuming an exemplary operating condition of 10 psig pressure, then the diaphragm will generate and transmit 100 pounds of force to a piston, which, in turn, may transmit the force to a buckling pin. In view of the foregoing principles, the set pressure of a disclosed pressure relief device may be calibrated according to the attributes of the chosen diaphragm device and buckling pin. Thus, it is contemplated that a wide range of set pressures may be implemented from a single set of hardware components.

Figure 14:
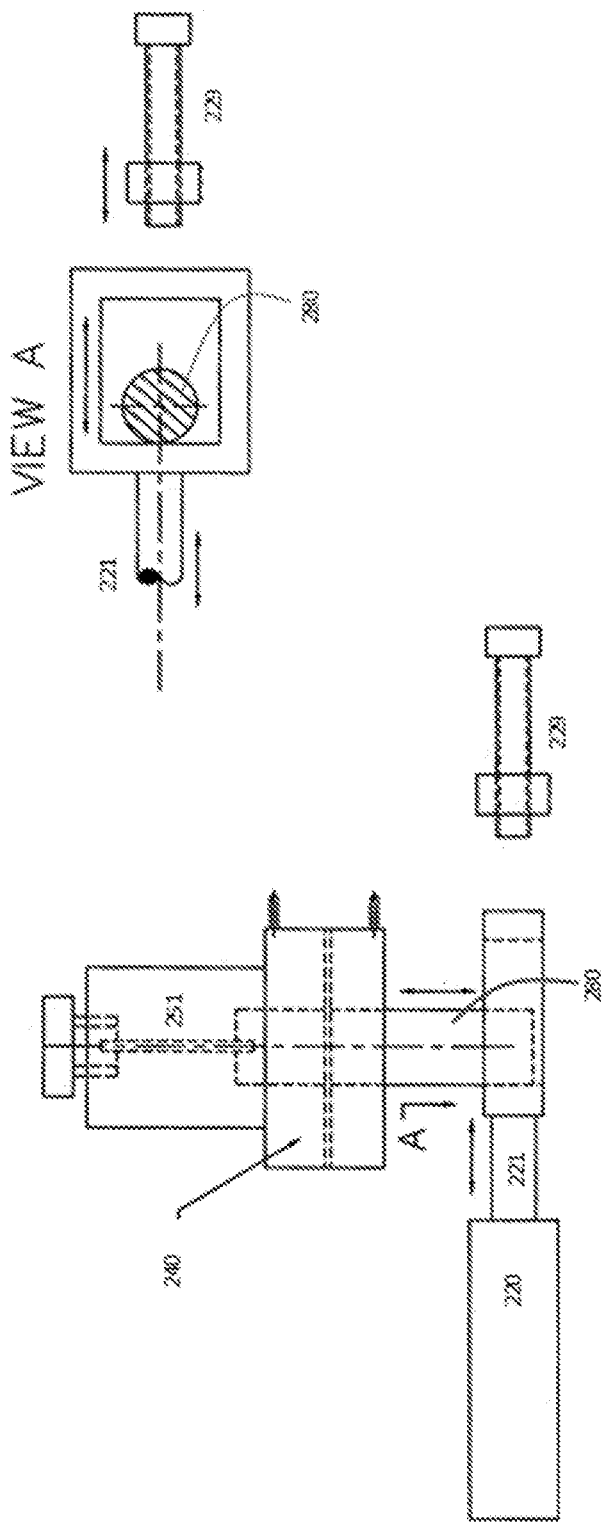
FIG. 14 illustrates an embodiment of a trigger mechanism for a spring actuator.

The embodiments discussed above use a roller system in conjunction with the spring actuator. Additional aspects of other triggering systems according to the disclosure are depicted in FIGS. 14, 15, and 16.

Although the spring rod illustrated, e.g., in FIG. 6A terminates in a roller, which may be configured to engage with a latch arm, it is also contemplated that a spring rod may terminate in a fixed contacting surface (e.g., without a roller). FIG. 14, for example, illustrates a spring actuator (220) having a spring rod (221), with a fixed contacting surface engaging with a latch arm (280). As illustrated in FIG. 14, a process pressure acts on a diaphragm device (240), which translates the pressure into a compressive force on a buckling pin (251). When the compressive force causes the pin (251) to fail, the latch arm (280) moves out of alignment with the spring rod (221), allowing the spring (not shown) to release and close the valve (also not shown). Further illustrated in FIG. 14, a reset bolt (229) may be used to push the spring back, to allow the valve to be reset and the pin to be replaced.

Figure 8A:
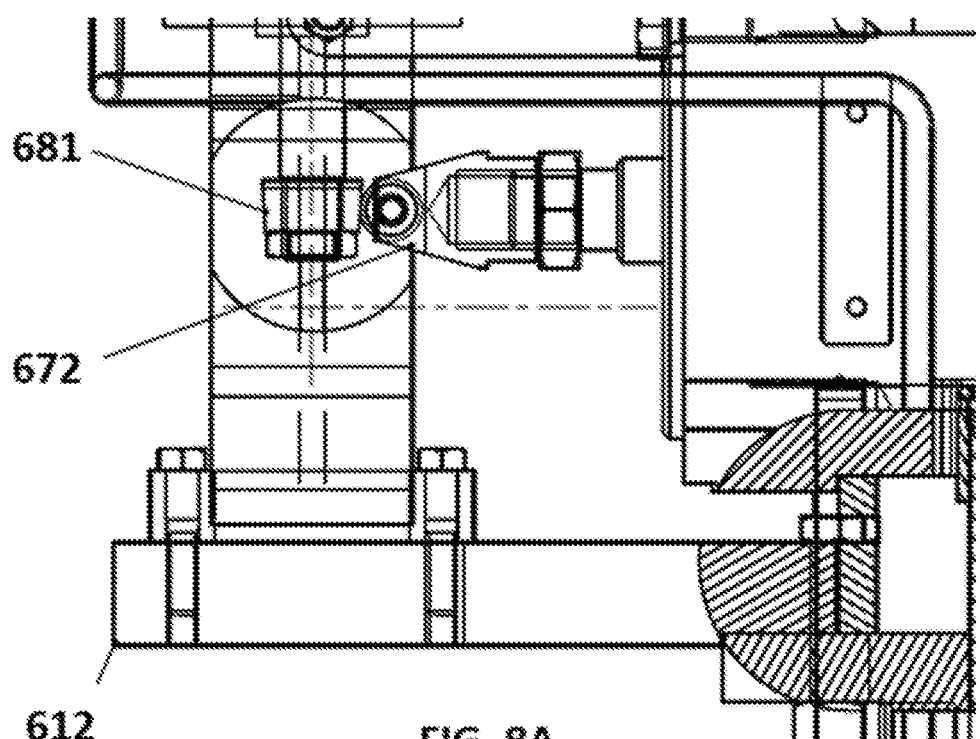
FIGS. 8A-8B provide a detailed view of the latch assembly depicted in FIGS. 6A-7B.
Figure 8B:
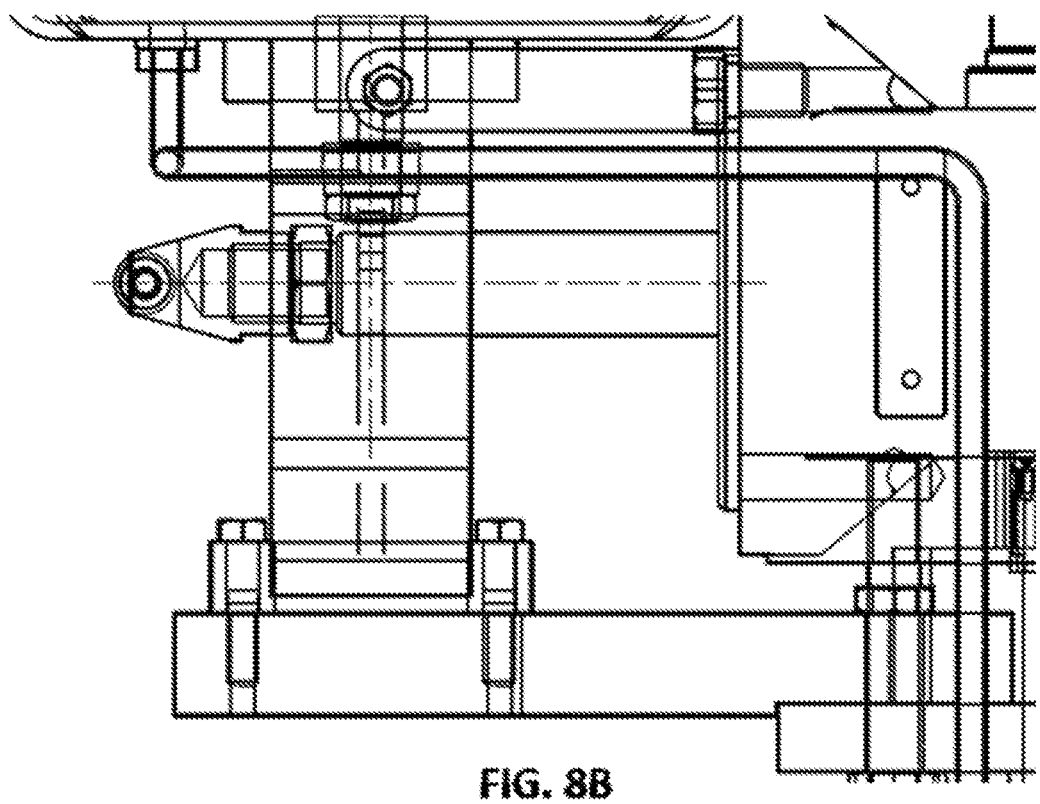
Figure 9:
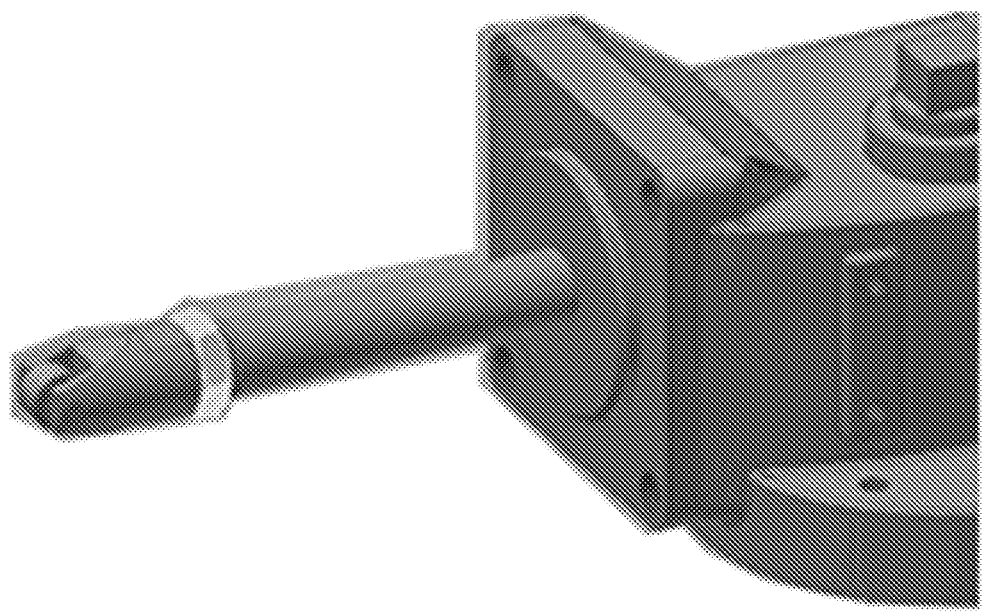
FIG. 9 illustrates a perspective view of a spring actuator.
Figure 15:
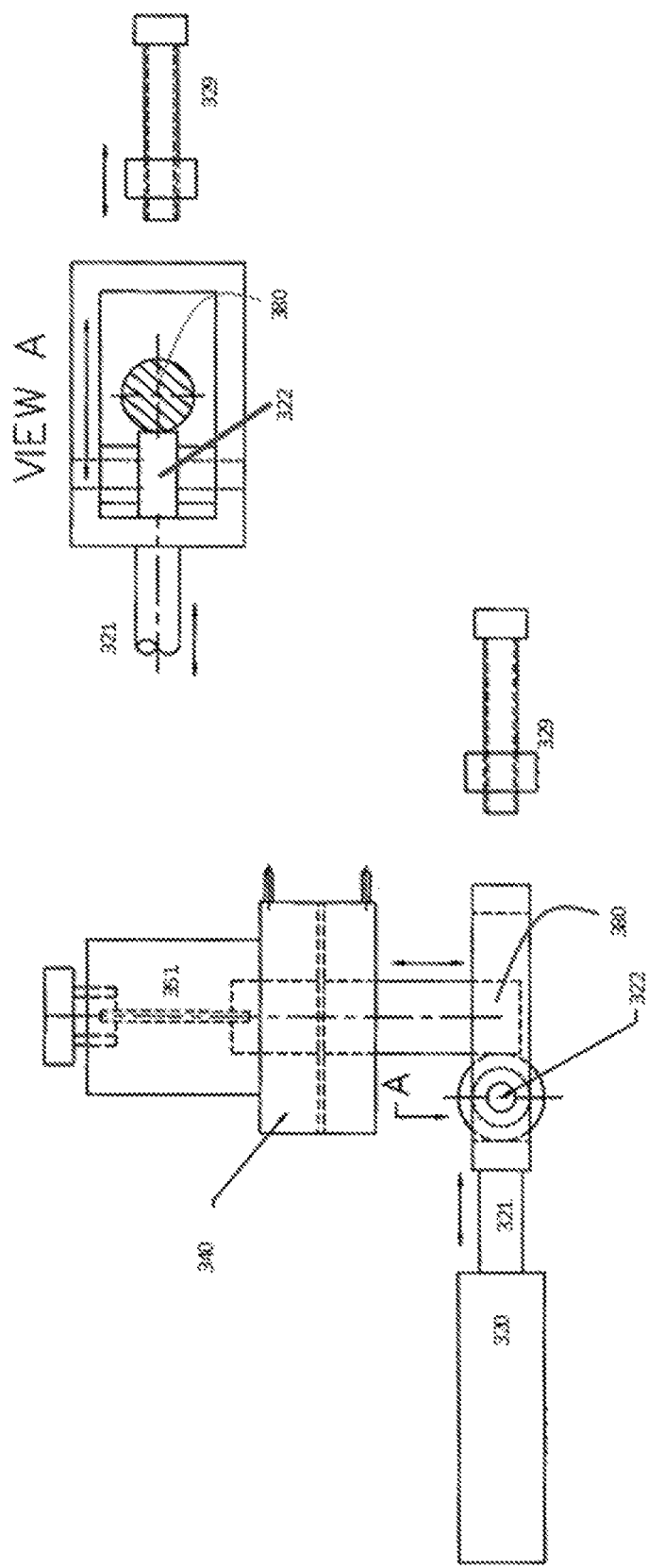
FIG. 15 illustrates another embodiment of a trigger mechanism for a spring actuator.
Figure 16:
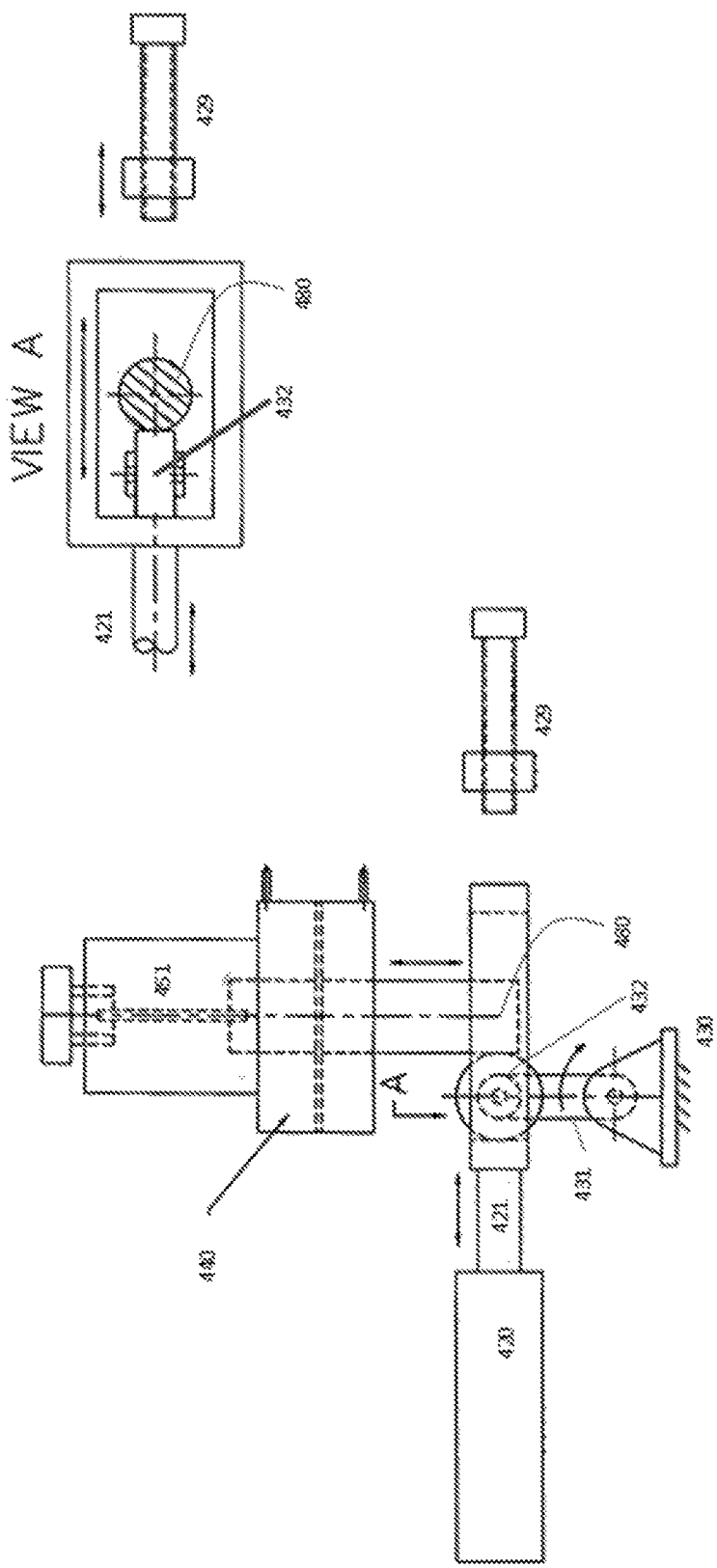
FIG. 16 illustrates a further embodiment of a trigger mechanism for a spring actuator.

FIG. 15 illustrates a spring actuator (320) having a spring rod (321), with a roller (322) similar to the roller illustrated in detail, e.g., in FIGS. 8A-8B. As illustrated in FIG. 15, a process pressure acts on a diaphragm device (340), which translates the pressure into a compressive force on a buckling pin (351). When the compressive force causes the pin (351) to fail, a latch arm (380) moves out of alignment with the roller (322) of spring rod (321), allowing the spring (not shown) to release and close the valve (also not shown). Further illustrated in FIG. 15, a reset bolt (329) may be used to push the spring back, to allow the valve to be reset and the pin to be replaced.

Embodiments discussed above involve direct engagement of a spring rod with a latch arm (via, e.g., a roller or a fixed contacting surface). Further embodiments may include an intermediary mechanism between the spring rod and latch arm. An intermediary mechanism may be designed to improve the interaction of the spring rod and latch arm. For example, an intermediary mechanism may be used to modify or direct the force imparted by the spring rod onto the latch arm. As another example, an intermediary mechanism may be used to reduce the role of friction that may otherwise impact the ability of the latch arm to disengage from (or otherwise move in relation to) the spring rod. In other words, an intermediary device may provide advantages in managing frictional effects of a pressure relief device and/or may improve accuracy of response pressure.

In one example of an intermediary mechanism, FIG. 16 illustrates a spring actuator (420) having a spring rod (421), with an intermediary mechanism (430) comprising a roller (432) mounted separately on a toggle (431). As illustrated in FIG. 16, the toggle roller (432) may be positioned between the spring rod (421) and the latch arm (480). In the embodiment of FIG. 16, the spring rod (421) terminates in a fixed surface. The toggle roller (432) may reduce or substantially eliminate the frictional forces that might otherwise be imparted if the spring rod (421) engaged directly with the latch arm (480). As illustrated in FIG. 16, a process pressure acts on a diaphragm device (440), which translates the pressure into a compressive force on a buckling pin (451). When the compressive force causes the pin (451) to fail, a latch arm (480) moves out of alignment with the toggle roller (432), allowing the toggle to rotate out of alignment with spring rod (421), allowing the spring (not shown) to release and close the valve (also not shown). Further illustrated in FIG. 16, a reset bolt (426) may be used to push the spring back, to allow the toggle and/or valve to be reset and the pin to be replaced.

Figure 17:
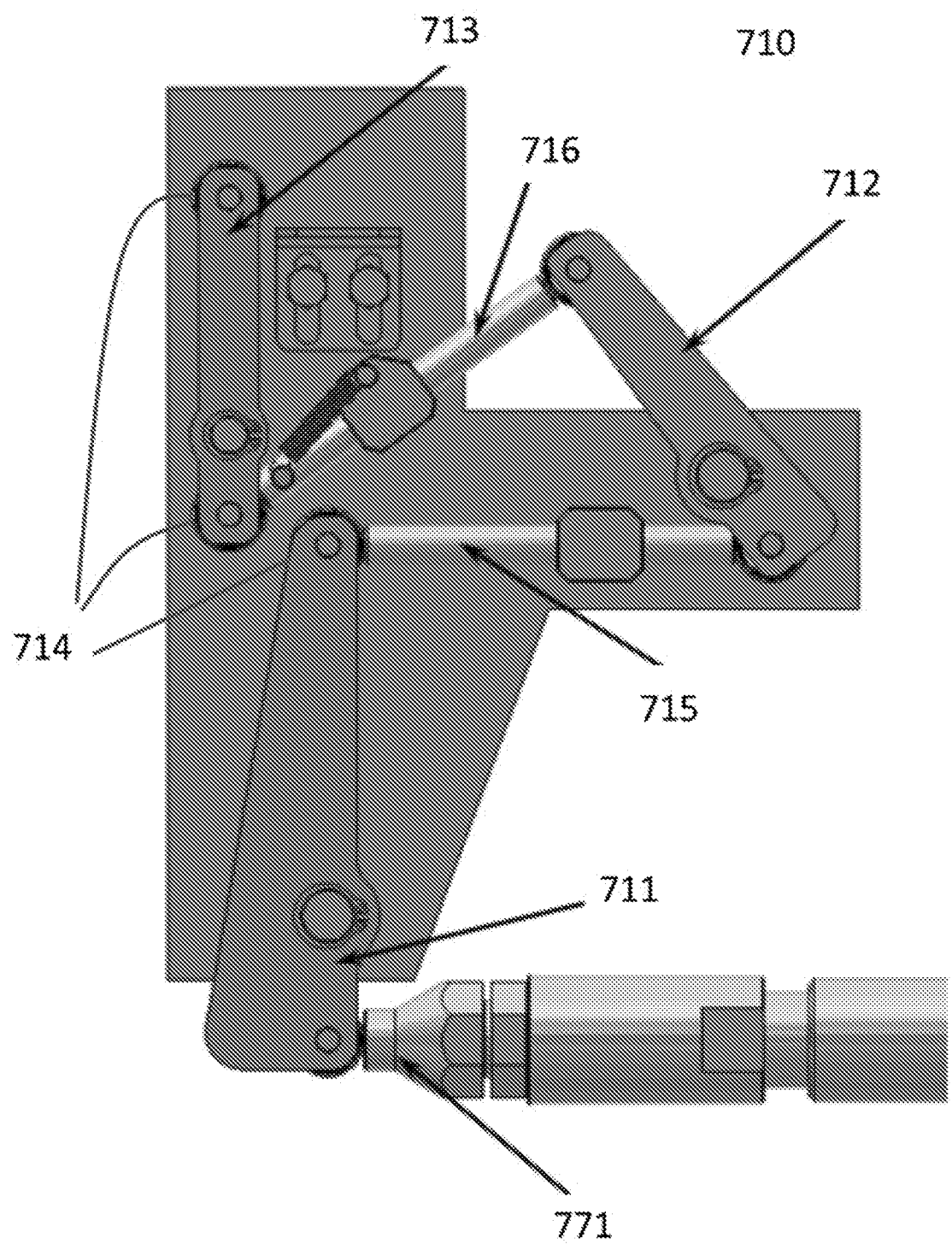
FIG. 17 illustrates an embodiment of a linkage assembly for a spring actuator.

FIG. 17 illustrates another embodiment of an intermediary mechanism. As illustrated, a spring rod has a spring actuator head (771). The spring actuator head engages with an intermediary mechanism in the form of a linkage assembly (710). As illustrated, the linkage assembly comprises three lever—arms first lever arm (711), second lever arm (712), and third lever arm (713). The illustrated linkage assembly further comprises two trigger rods—first trigger rod (715) and second trigger rod (716). According to the embodiment illustrated in FIG. 17, one or more trigger rods may be held in place via sliding engagement (similarly to a piston). As also illustrated, one or more trigger rods may be held in place via a retaining spring. A retaining spring may, for example, return the trigger rod into position following activation of the valve. As illustrated, the spring actuator head (771) engages with one end of first lever arm (711). A load imparted by the spring actuator head is transferred via first lever arm (711), through first trigger rod (715) to second lever arm (712), and through second trigger rod (716) to third lever arm (713). A terminal end of third lever arm (713) may engage with a latch arm (illustrated in FIG. 18), ultimately transferring the load imparted by the spring actuator head to the latch arm.

As illustrated in FIG. 17, one or more lever arms of a linkage assembly may be provided with one or more rollers. Such rollers may permit the components of the linkage assembly to move freely (e.g., with little or substantially no friction) relative to each other upon activation of the actuator system. Other interfaces between the components of a linkage assembly are also contemplated. For example, components of a linkage assembly may be connected by a hinge, such as a mechanical or plastic hinge. While the assembly depicted in FIG. 17 may permit the components to fall out of engagement with one another following activation, a hinge may keep such components in engagement throughout and/or after activation.

The embodiments discussed above use a buckling pin mechanism, such as the buckling pin mechanism (5) illustrated in FIG. 1. As shown in FIG. 1, a buckling pin mechanism may include a buckling pin housed within a housing, cover, or buckling pin cage. FIG. 2 illustrates a buckling pin mechanism without such a housing, cover, or buckling pin cage.

Although FIGS. 1 and 2 depict a buckling pin as the activation mechanism, or trigger, for a pressure relief device, the disclosure is not limited to that design, and other suitable mechanisms may be used. For example, other destructive activation mechanisms, such as a shear pin or a tensile bending pin may be used in one embodiment of the disclosure. In another embodiment, the activation mechanism may take the form of a spring or other force-retaining device capable of calibration to provide a known activation pressure response (i.e., "set pressure") to the pressure relief device.

Figure 10:
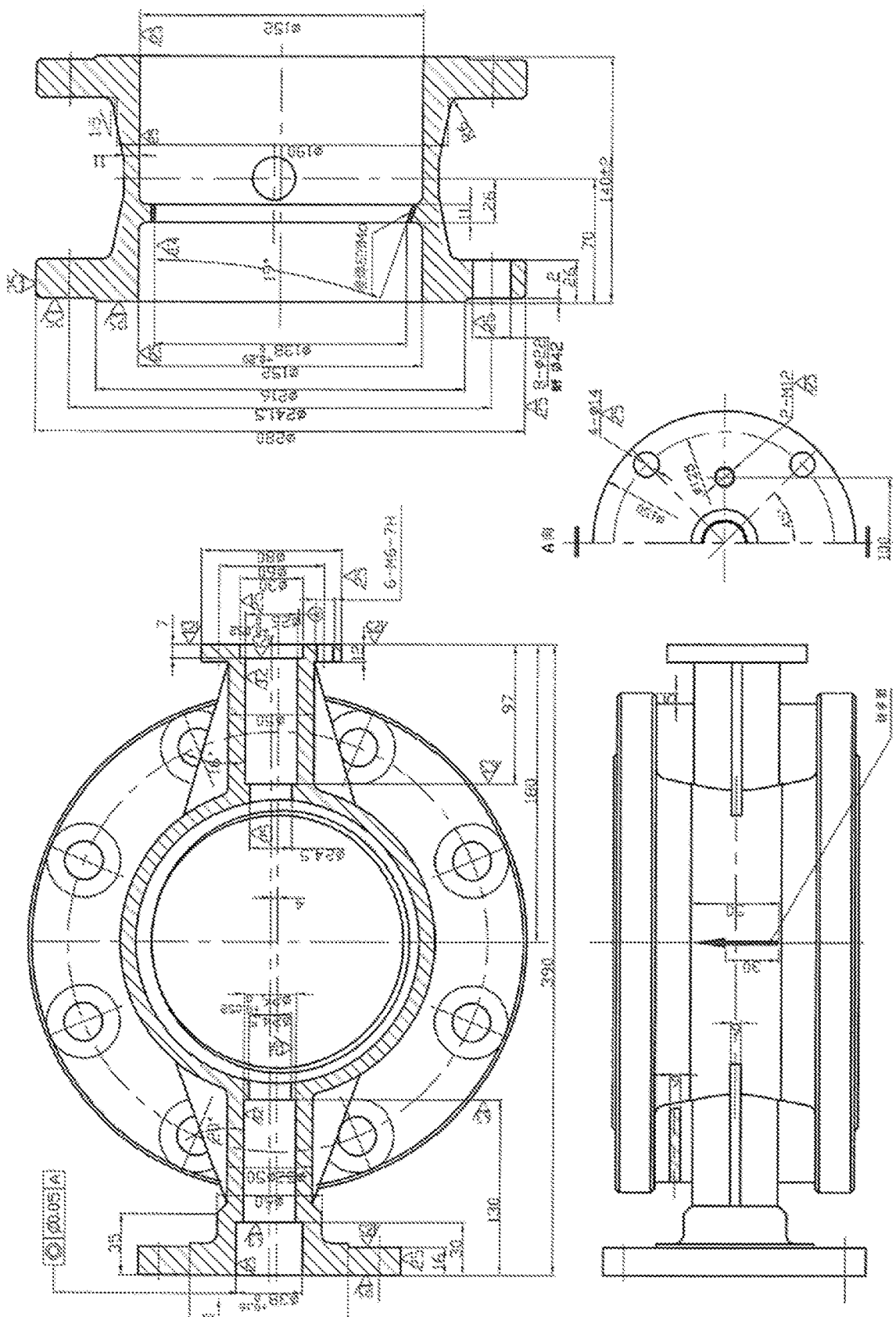
FIG. 10 illustrates a butterfly valve body.
Figure 11:
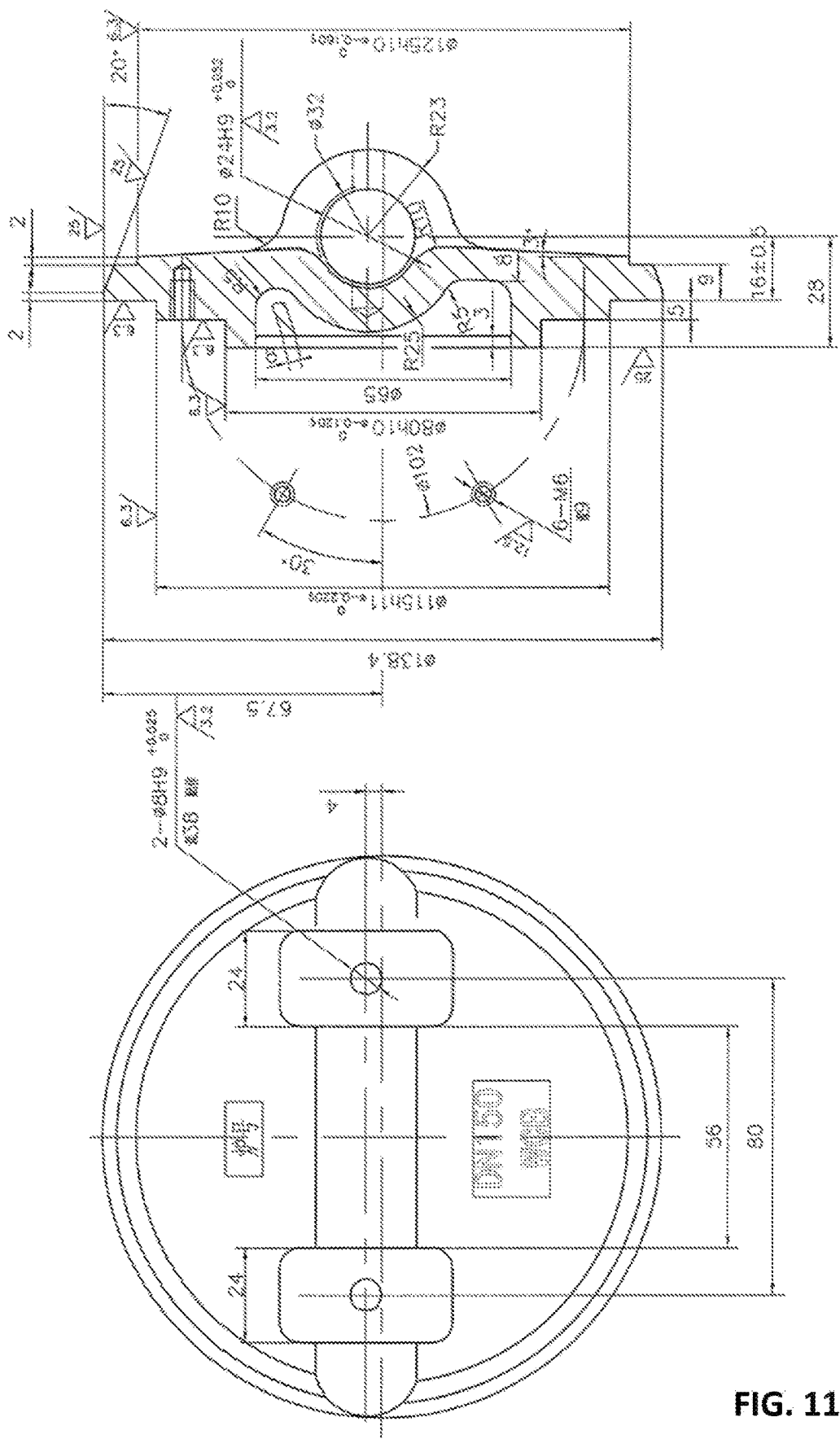
FIG. 11 illustrates a butterfly valve plug.

One embodiment of a butterfly valve according to the present disclosure is depicted in FIG. 10. Also, FIG. 11 depicts one embodiment of a plug for a butterfly valve.

Figure 12:
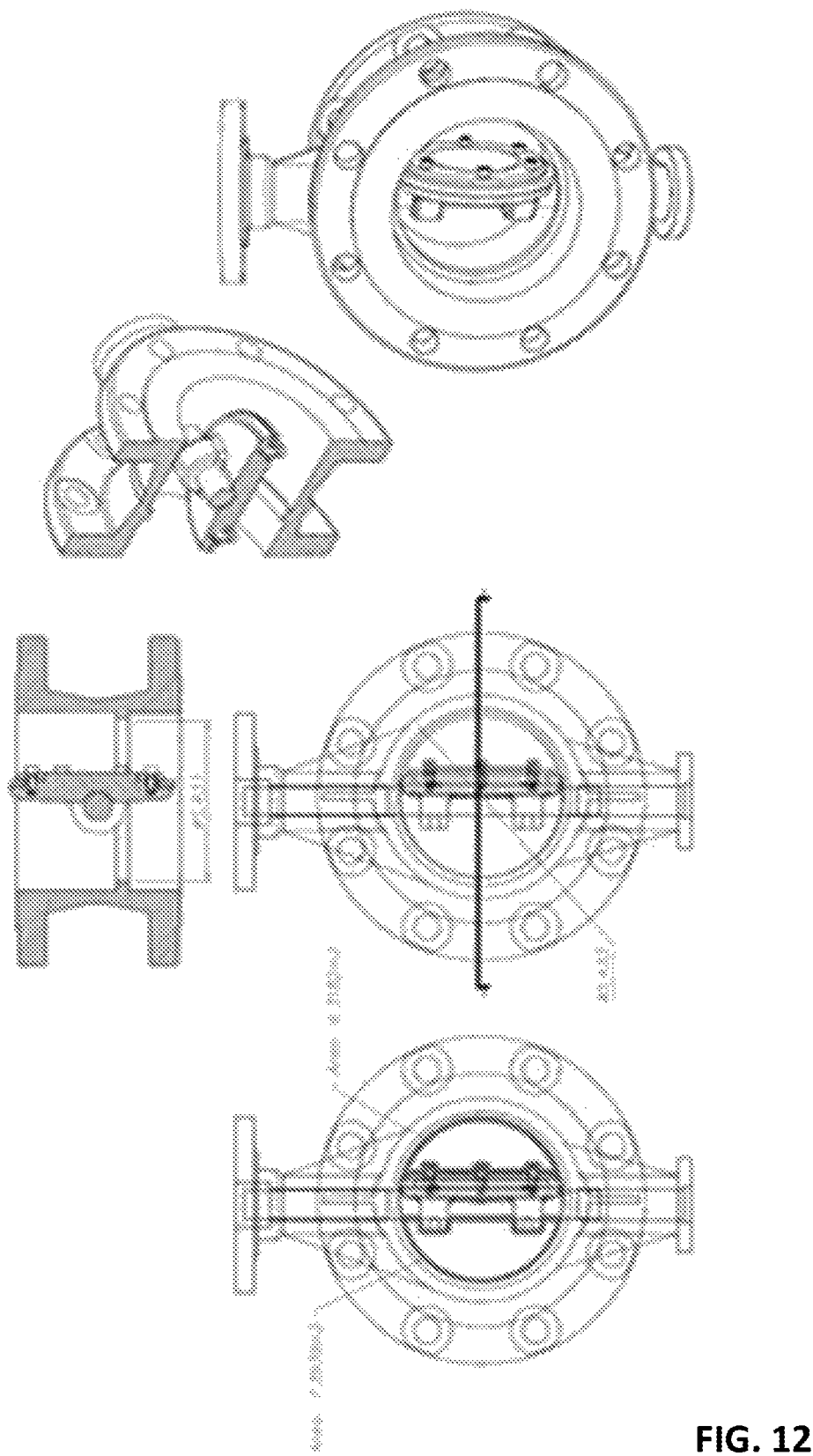
FIG. 12 illustrates a butterfly valve.

FIG. 12 depicts multiple views of another embodiment of a butterfly valve, including perspective views and cross-sectional views of the butterfly valve in the open configuration. The drawings in FIG. 12 demonstrate how an offset shaft may assist in valve opening, as well as with clearing the valve plug away from the valve body seat with minimum obstruction (which may desirably maximize flow/minimize Kr value).

In one embodiment, a disclosed pressure relief device may be provided with a double-flange butterfly valve plug, wherein the plug body is provided with a sealing flange on each of the inlet and outlet sealing faces of the plug. The disclosure further contemplates that the valve plug may have a single sealing flange. Further, the disclosure contemplates using a wafer-type butterfly valve. Moreover, the disclosure is not limited only to butterfly valves. It is contemplated, for example, that the disclosed release mechanism may be used with a ball valve, globe valve, knife gate valve, or other valve designed to move between an open and closed position.

In the embodiments discussed above, including the embodiments illustrated in FIGS. 1, 2, 6A, and 6B, the butterfly valve is a normally-closed design. In another embodiment, a normally-open valve may be used. In such an embodiment, the valve may be designed to actuate into the closed position in response to a set pressure being reached in the system.

According to the present disclosure, any type of butterfly valve may be used. In one embodiment, a triple-offset-type of butterfly valve may be used. Such a butterfly valve may provide enhanced sealing capabilities.

Figure 13:
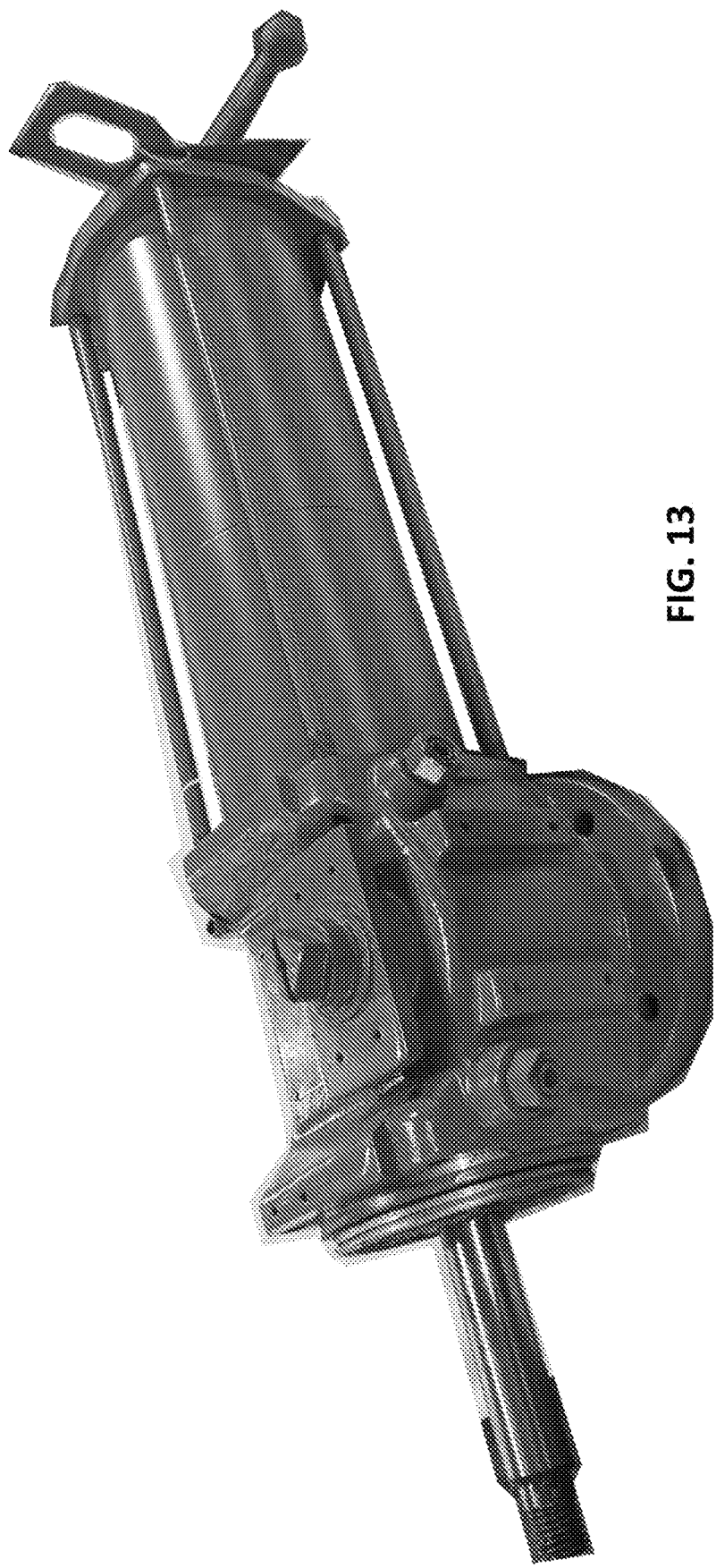
FIG. 13 illustrates a spring actuator.

In FIGS. 1 and 2, the actuator is depicted as a spring actuator. Another embodiment of a spring actuator is illustrated in FIG. 13.

A spring-loaded actuator may provide advantages, such as the ability to act passively (e.g., without requiring an external power source). Nonetheless, it is contemplated that other types of actuators may be used, including actuators that rely on external power sources. In one embodiment, an actuator may be an electric or pneumatic actuator.

The present disclosure contemplates that the opening of a butterfly valve can be independent of the process pressure.

In one embodiment, the spring actuator can be selected to overcome any valve closing/opening friction and any pressure conditions in the piping system.

In one embodiment, a valve may be configured to open with a pressure differential that was negative between inlet and outlet side, such that the flow would be backwards through the valve.

In one embodiment, a valve may be configured to have multiple pilot tubes, e.g., two independent pilot tubes feeding into either a single shared or two separate buckling pin mechanisms. In such an embodiment, the valve may be configured to open according to two different pressure conditions. For example, the valve may be configured to open according to a first pressure condition on the inlet side and/or configured to open according to a second pressure condition on the outlet side. In another embodiment, a single pilot mechanism may be connected to both inlet and outlet sides of the butterfly valve, and the pressure relief device assembly may be configured to be sensitive to the pressure differential between inlet and outlet sides.

In one embodiment, a valve may be configured for more than one type of application pressure response. For example, in one embodiment, a pilot tube may be configured to transmit system pressure solely from the inlet side of a butterfly valve into a pneumatically sealed chamber within a diaphragm device (e.g., as described above in connection with FIGS. 6A and 6B), which will translate the system pressure into a compressive force transmitted a buckling pin. In that configuration, the activation of the valve may occur independent of any backpressure condition on the valve. In another embodiment, however, a second pilot line may transmit pressure from another region to the diaphragm device. For example, a second pilot line may transmit pressure from the outlet side of a butterfly valve to the diaphragm device, which may allow the diaphragm device to be configured as a differential pressure activated device. I.e., the diaphragm device may be configured to activate when a pressure differential between the inlet and outlet sides of a butterfly valve reaches a predetermined level.

In one embodiment, an actively actuated valve may be provided, which may be caused to open on demand (e.g., in response to a measured pressure differential between the inlet and outlet sides of a butterfly valve). For example, a valve may be configured to open by causing a buckling pin to activate through pyrotechnic device causing the pin to buckle. In another example, a valve may be configured to open by causing a gas generator to increase the pressure on the inlet side of a diaphragm device. In another example, an electrical actuator may be configured to buckle a buckling pin, either directly or by adding force to that provided by the application conditions from the diaphragm device.

Figure 18:
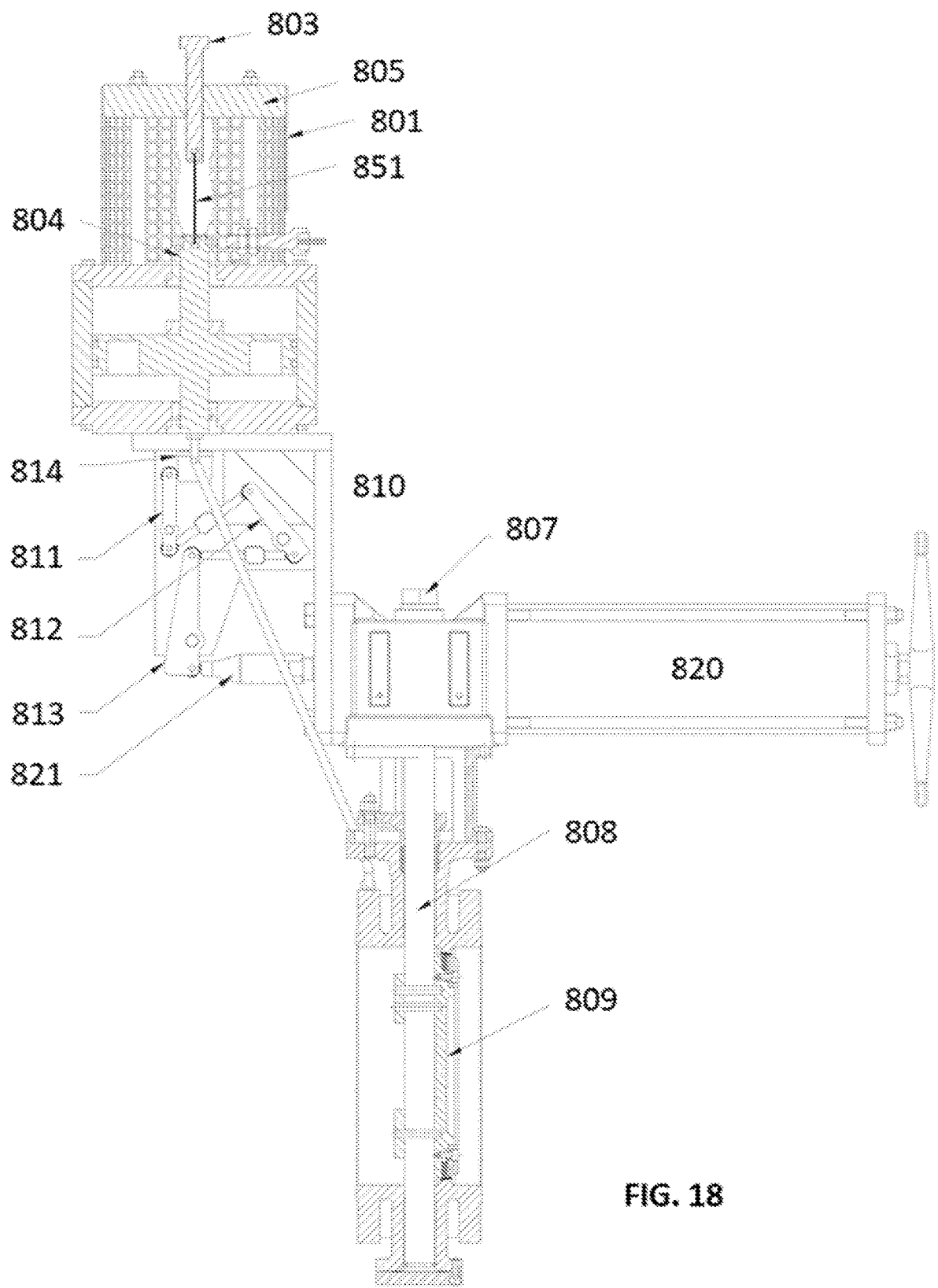
FIG. 18 illustrates an embodiment of a piston-type pressure relief device.

Embodiments discussed above have been described as having a flexible diaphragm configured to convert a system pressure into a compressive force. The disclosure is not limited to that configuration. In another embodiment, a piston may be used to convert a system pressure into a compressive force. For example, as shown in FIG. 18, a spring actuator (820) having a spring actuator head (821) is engaged with a third lever arm (813) of a linkage assembly (810). The spring actuator head (821) engages with a roller on the third lever arm (813). The linkage assembly (810) is configured to transmit a force from the spring actuator to a latch arm (814), via third lever arm (813), second lever arm (812), and first lever arm (811), in a manner described above in connection with FIG. 17. The latch arm (814) is engaged with a piston (804) in a piston cylinder, and the piston (804) is engaged with a buckling pin (851). One or more pilot tubes (not shown) may transmit a pressure from the system to the piston cylinder. For example, a pilot tube may transmit a pressure from the inlet side of a butterfly valve to the piston cylinder. When the pressure in the piston cylinder reaches a predetermined level, the piston may cause the buckling pin to buckle. Buckling of the buckling pin will allow the piston to move upward, thereby removing the latch arm (814) out of contact with the linkage assembly, and releasing the spring actuator to rotate the butterfly valve into an open position. As illustrated, the spring assembly has a yoke shaft (807). The valve plug (809) connects to the spring assembly via a plug shaft (808).

As illustrated in FIG. 18, the buckling pin (851) may be held in position via an adjuster screw (803). The buckling pin assembly may be surrounded by a pin cage (805) having a protective screen (801).

Figure 19:
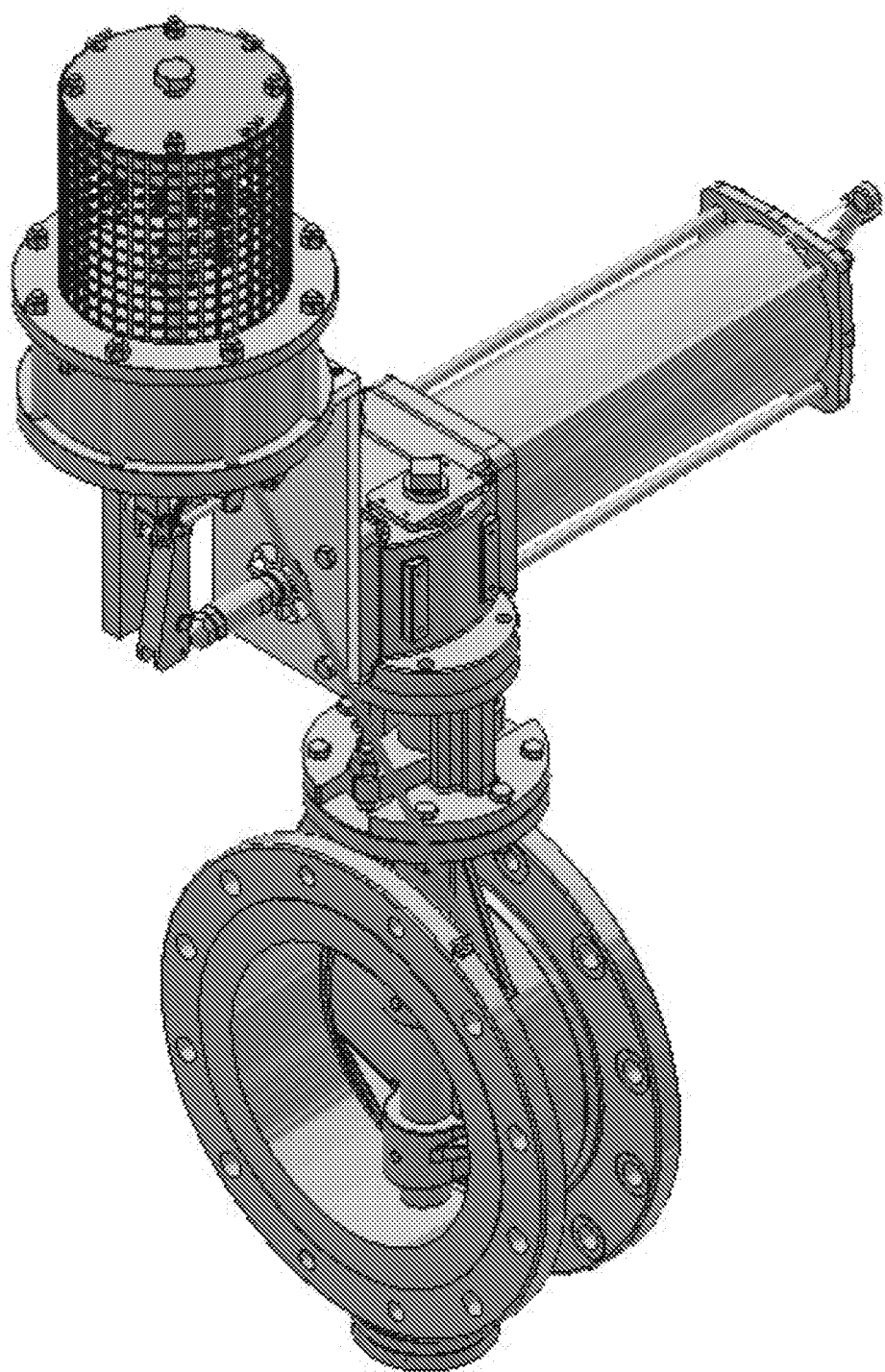
FIG. 19 is a perspective view of an embodiment of a piston-type pressure relief device.

FIG. 19 provides a perspective view of another embodiment of a pressure relief device assembly comprising a butterfly valve, spring actuator, linkage assembly, and piston engaged with a buckling pin.

Figure 20:
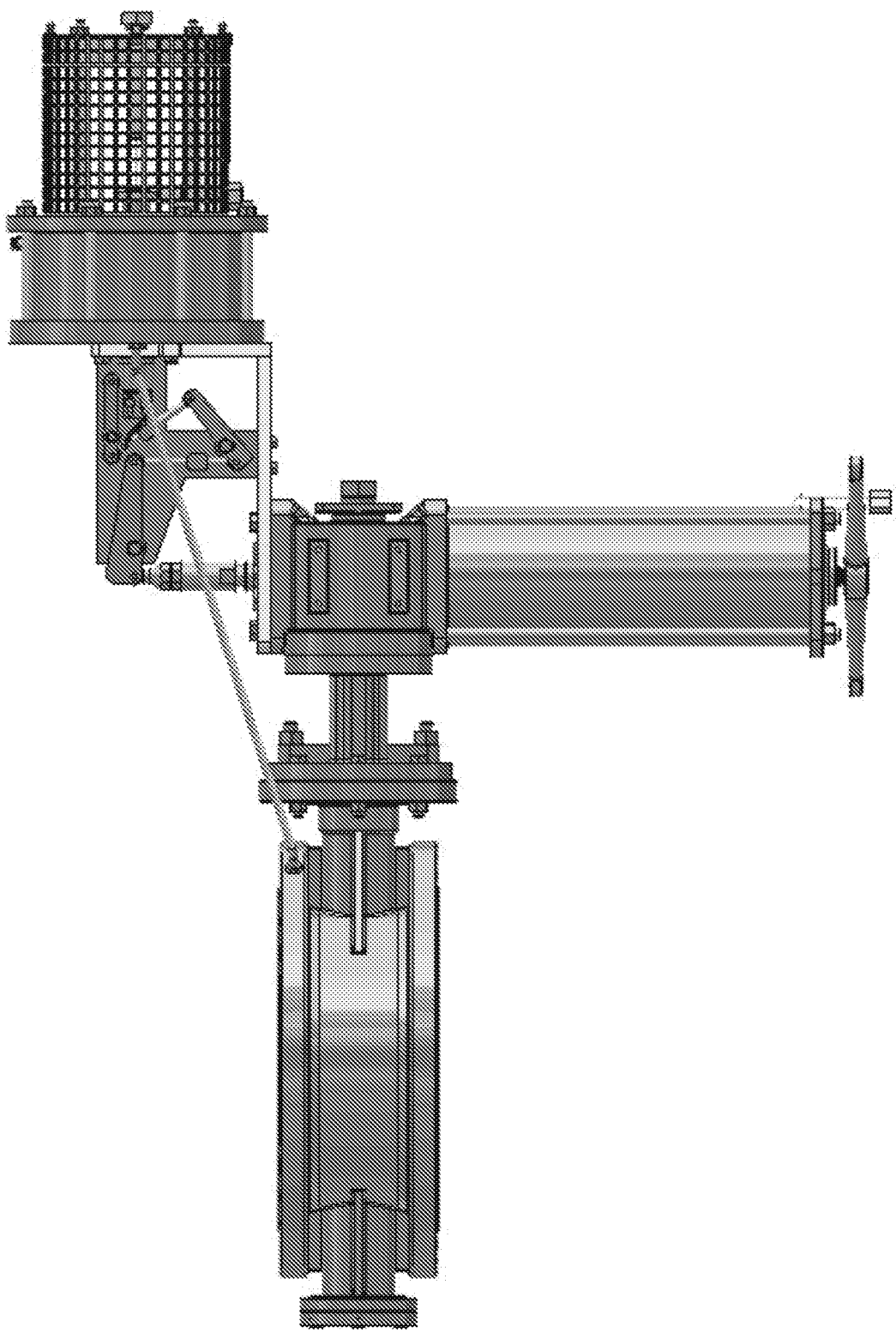
FIG. 20 is a front view of the pressure relief device of FIG. 19.

FIG. 20 illustrates a front view of the embodiment illustrated in FIG. 19.

Figure 21:
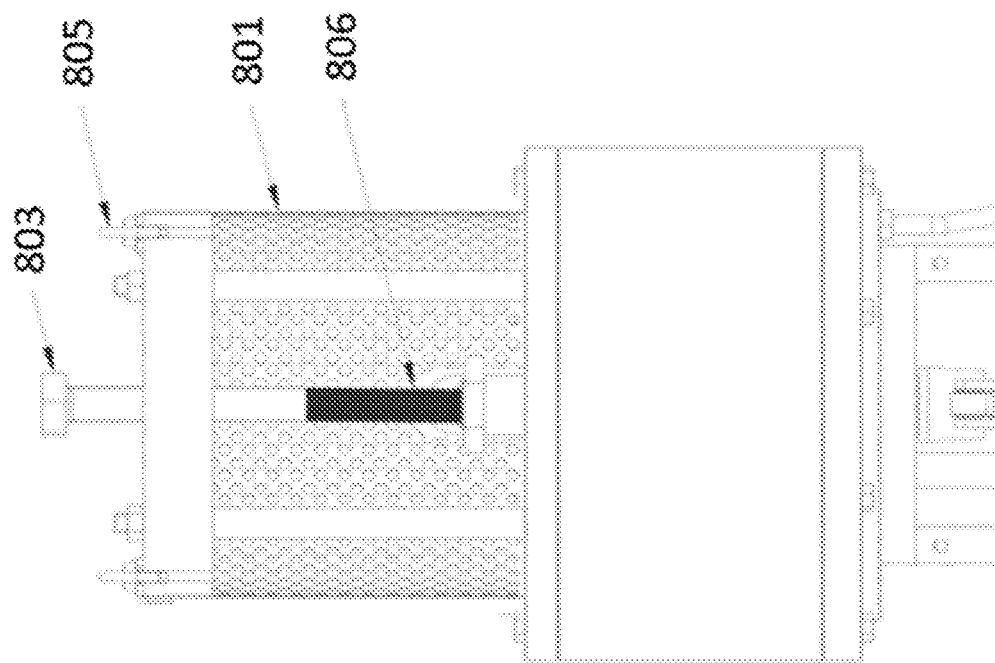
FIG. 21 illustrates another embodiment of a pressure relief device.

FIG. 21 illustrates another embodiment of a pressure relief device illustrated in FIG. 18, having a shipping pin (806) installed between an adjuster screw and a piston.

Figure 22:
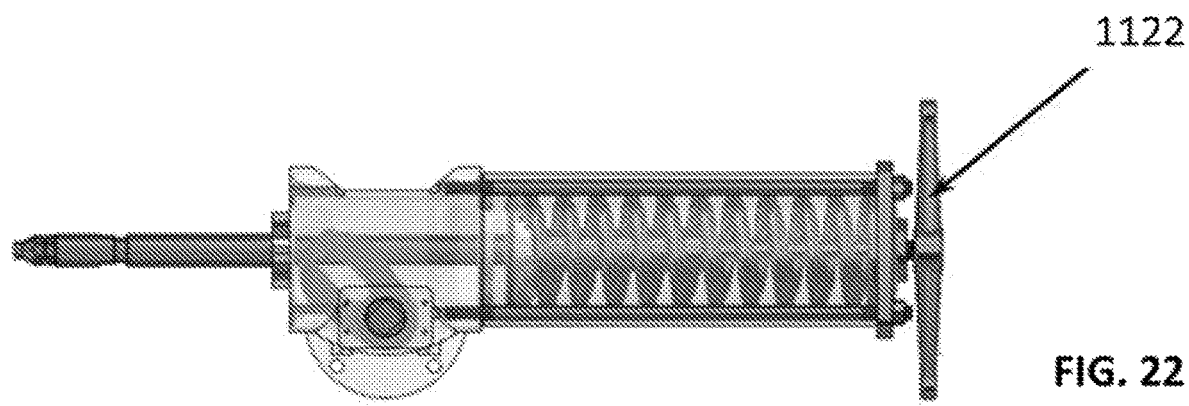
FIGS. 22, 23, and 24 illustrate a spring actuator according to an embodiment of the disclosure.
Figure 23:
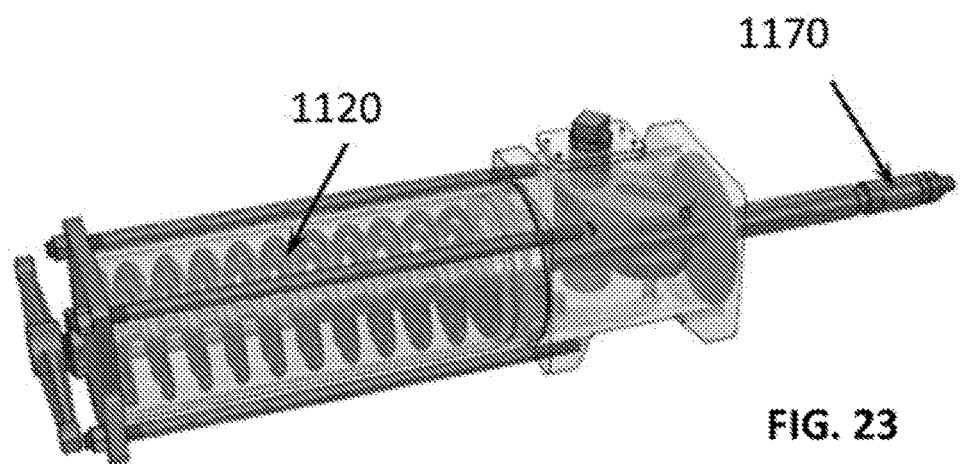
Figure 24:
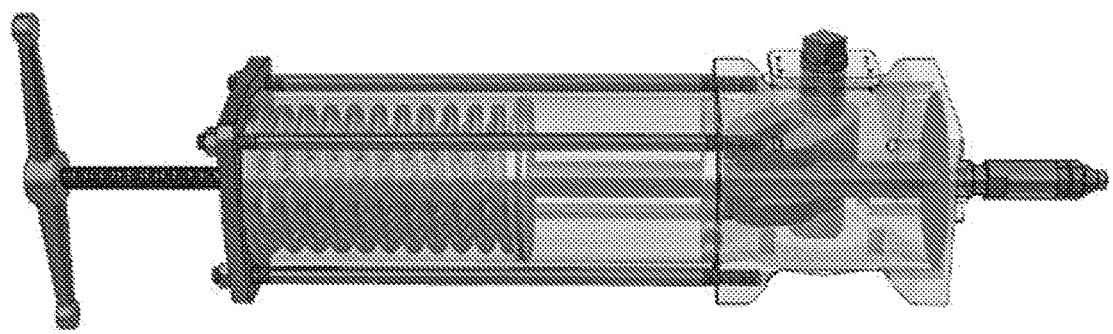

FIGS. 22, 23, and 24 illustrate a spring actuator according to an embodiment of the disclosure. As illustrated, the spring actuator is provided with a set/reset wheel (1122), which may be rotated to load the spring (1120), set the spring actuator into position, and set the spring actuator head (1170) and any load transfer mechanisms (e.g., the linkage assembly described above) into position.

Figure 25:
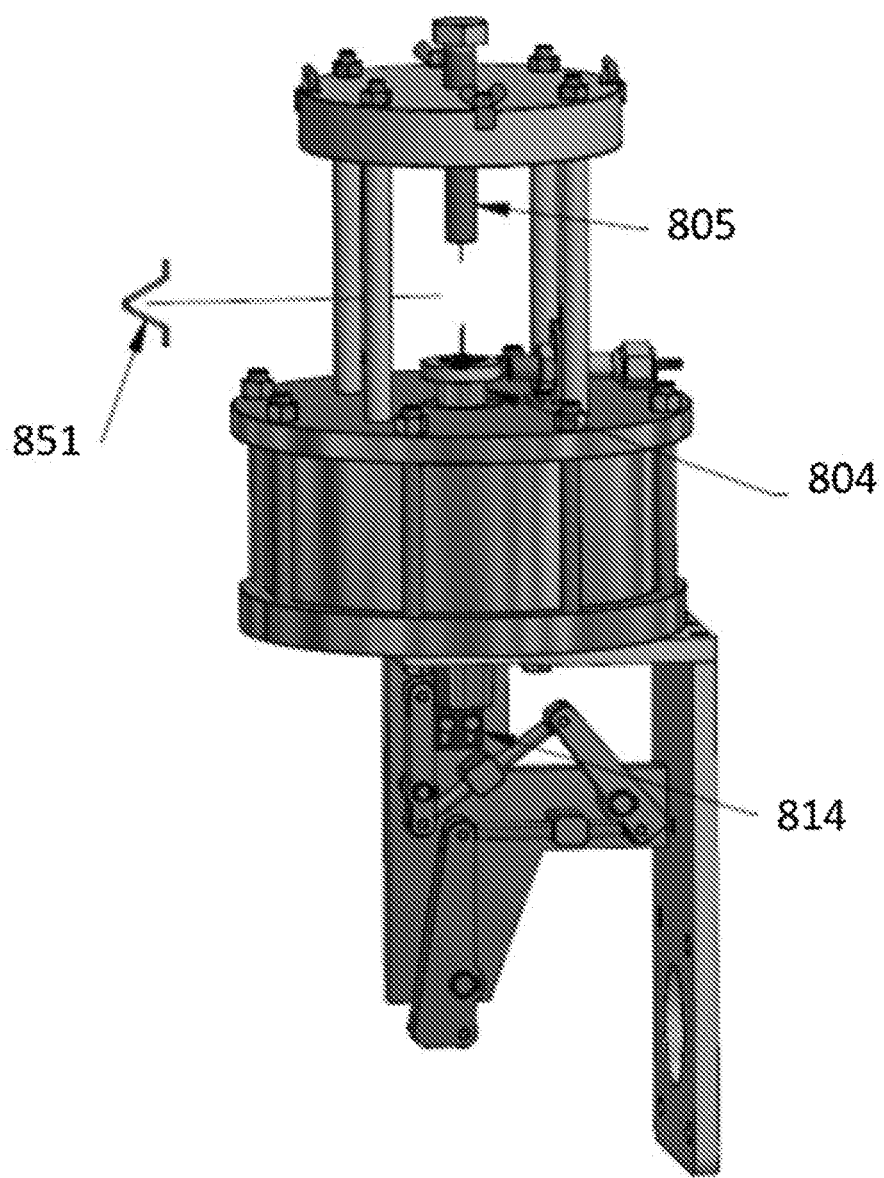
FIG. 25 illustrates an embodiment of a pressure relief device assembly following the buckling of a buckling pin.

FIG. 25 illustrates another embodiment of a pressure relief device assembly following the buckling of a buckling pin. As illustrated, a piston (804) has been pressed downward into contact with a piston stopper (814) to allow removal of a buckled pin (851) from between the piston and adjuster screw (805).

Figure 26:
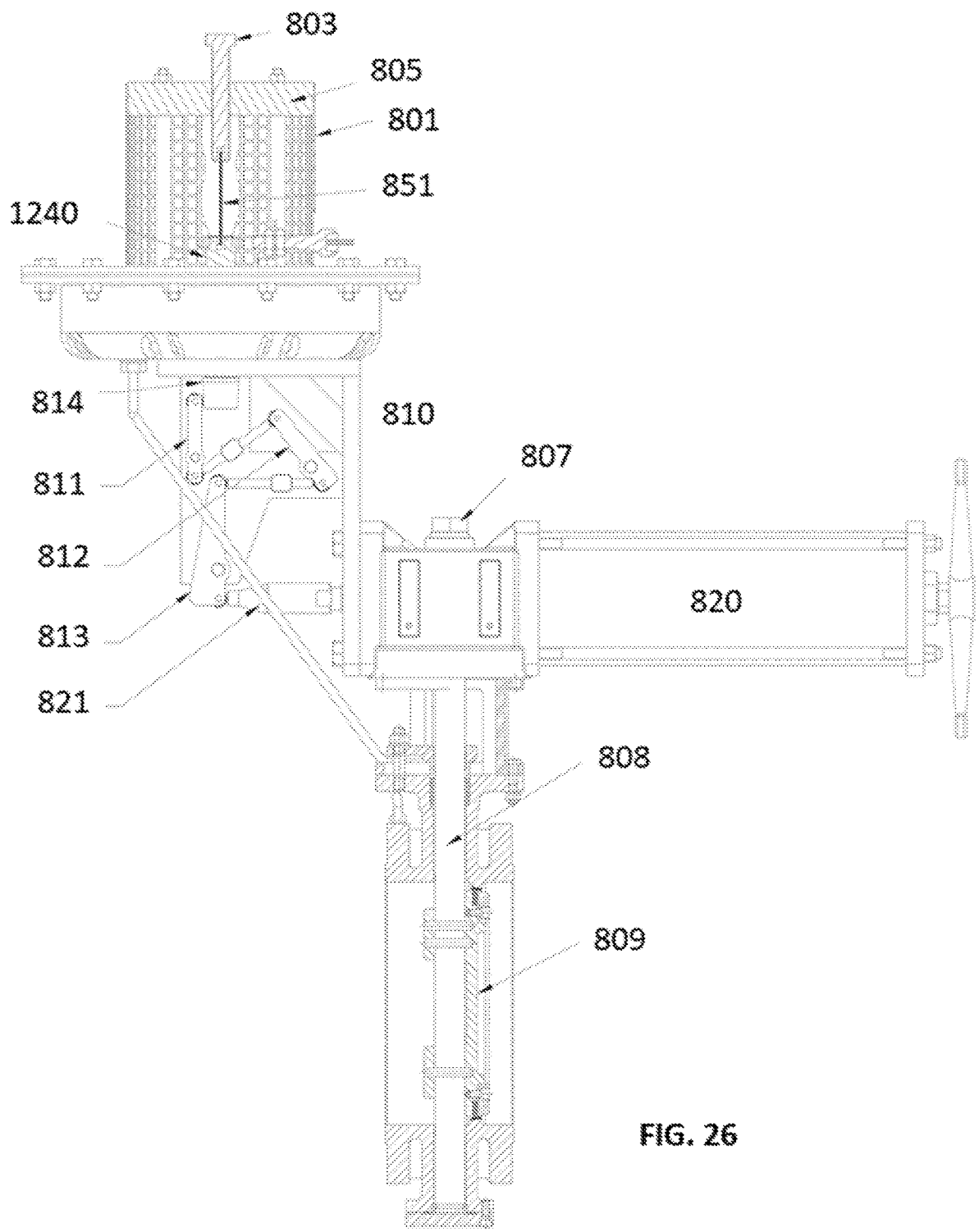
FIG. 26 illustrates an embodiment of a diaphragm-type pressure relief device assembly.

FIG. 26 illustrates a diaphragm-type embodiment of a pressure relief device assembly according to the disclosure. As illustrated, a diaphragm device (1240) is used in place of the piston assembly depicted in FIG. 18.

Figure 27:
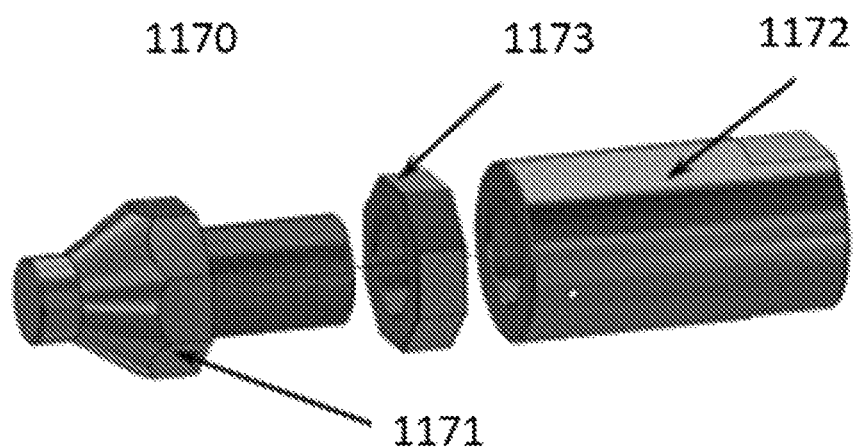
FIG. 27 illustrates an exploded view of one embodiment of a spring actuator head.

FIG. 27 illustrates an exploded view of one embodiment of a spring actuator head (1170), such as illustrated in FIGS. 22, 23, and 24. As illustrated, a head member (1171) is held within the body (1172) via a nut (1173).

Figure 28:
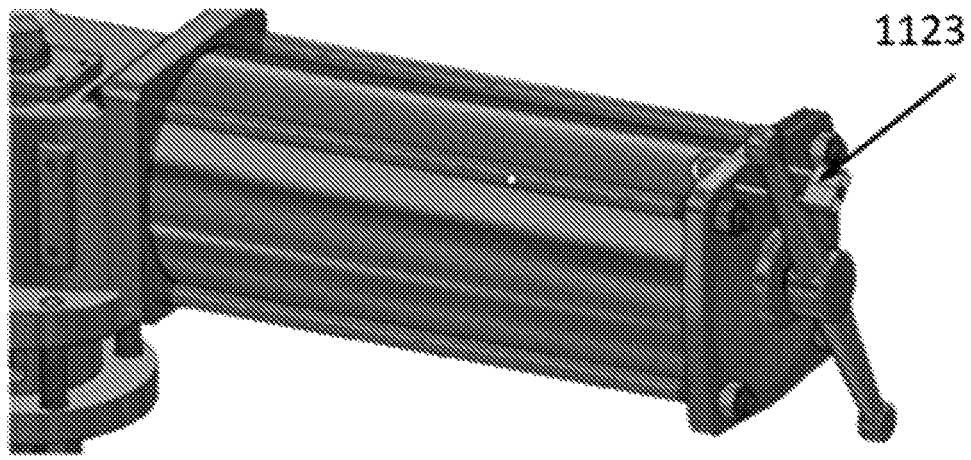
FIG. 28 illustrates a wheel lock according to one embodiment.

FIG. 28 illustrates a wheel lock (1123), which may be provided to lock a set/reset wheel (such as illustrated in FIGS. 22, 23, and 24) into position.

Figure 29:
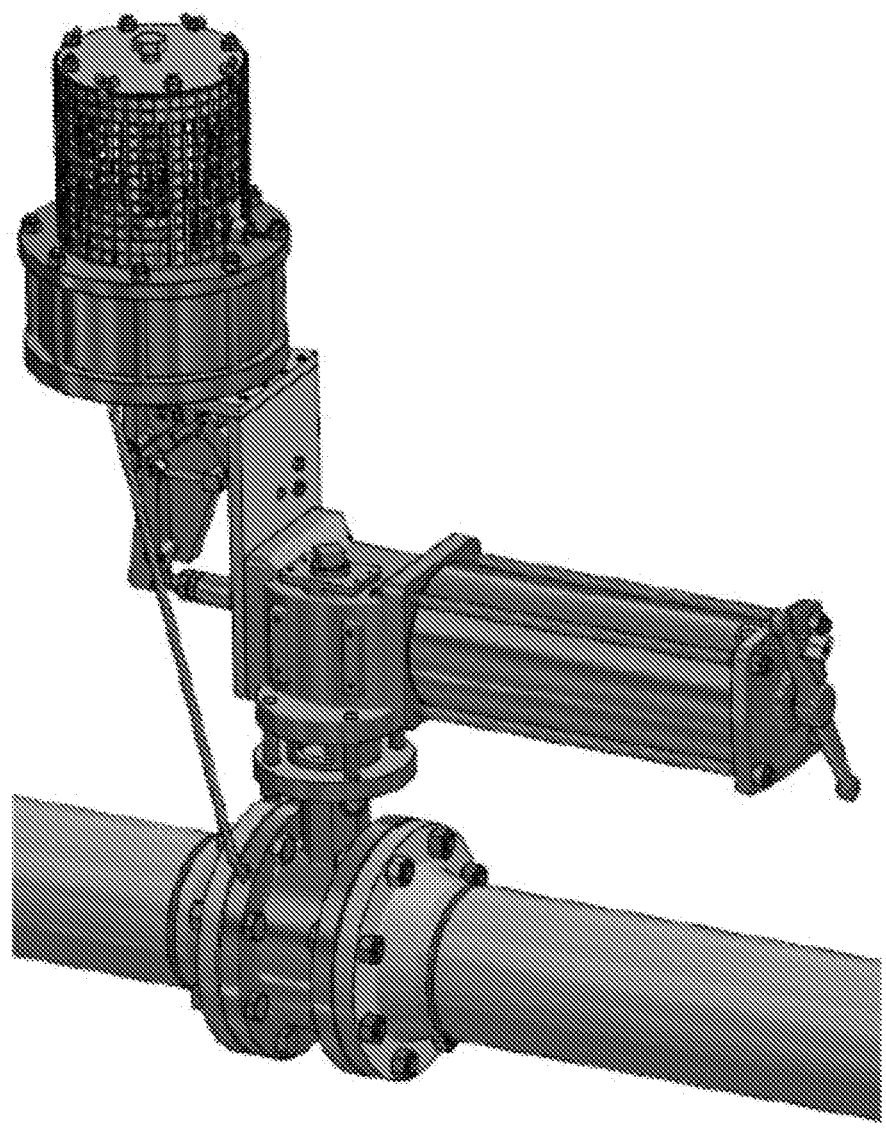
FIG. 29 illustrates another embodiment of a piston-type pressure relief device assembly.

FIG. 29 illustrates another embodiment of a piston-type pressure relief device assembly.

Figure 30:
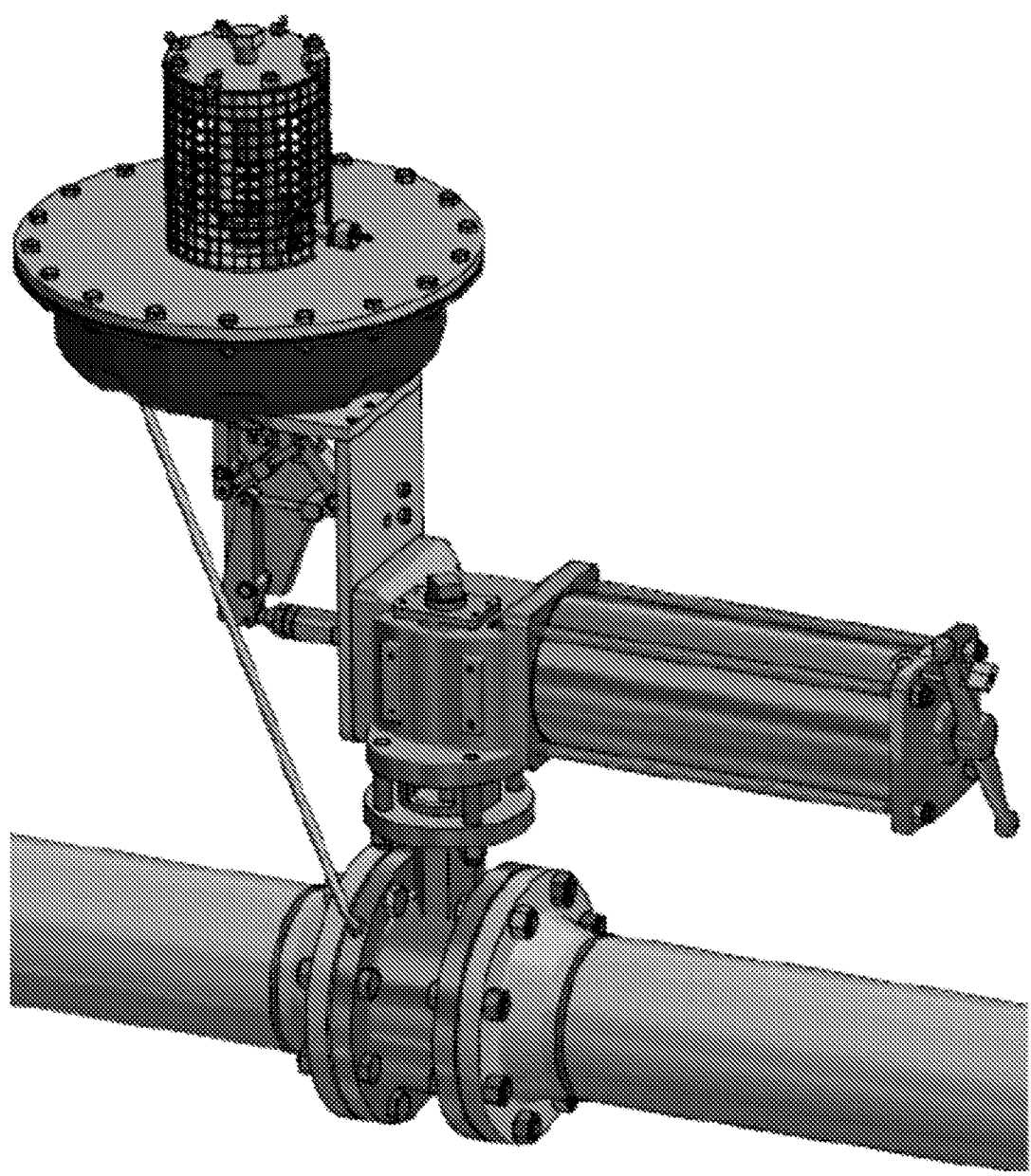
FIG. 30 illustrates another embodiment of a diaphragm-type pressure relief device assembly.

FIG. 30 illustrates another embodiment of a diaphragm-type pressure relief device assembly.

Figure 31:
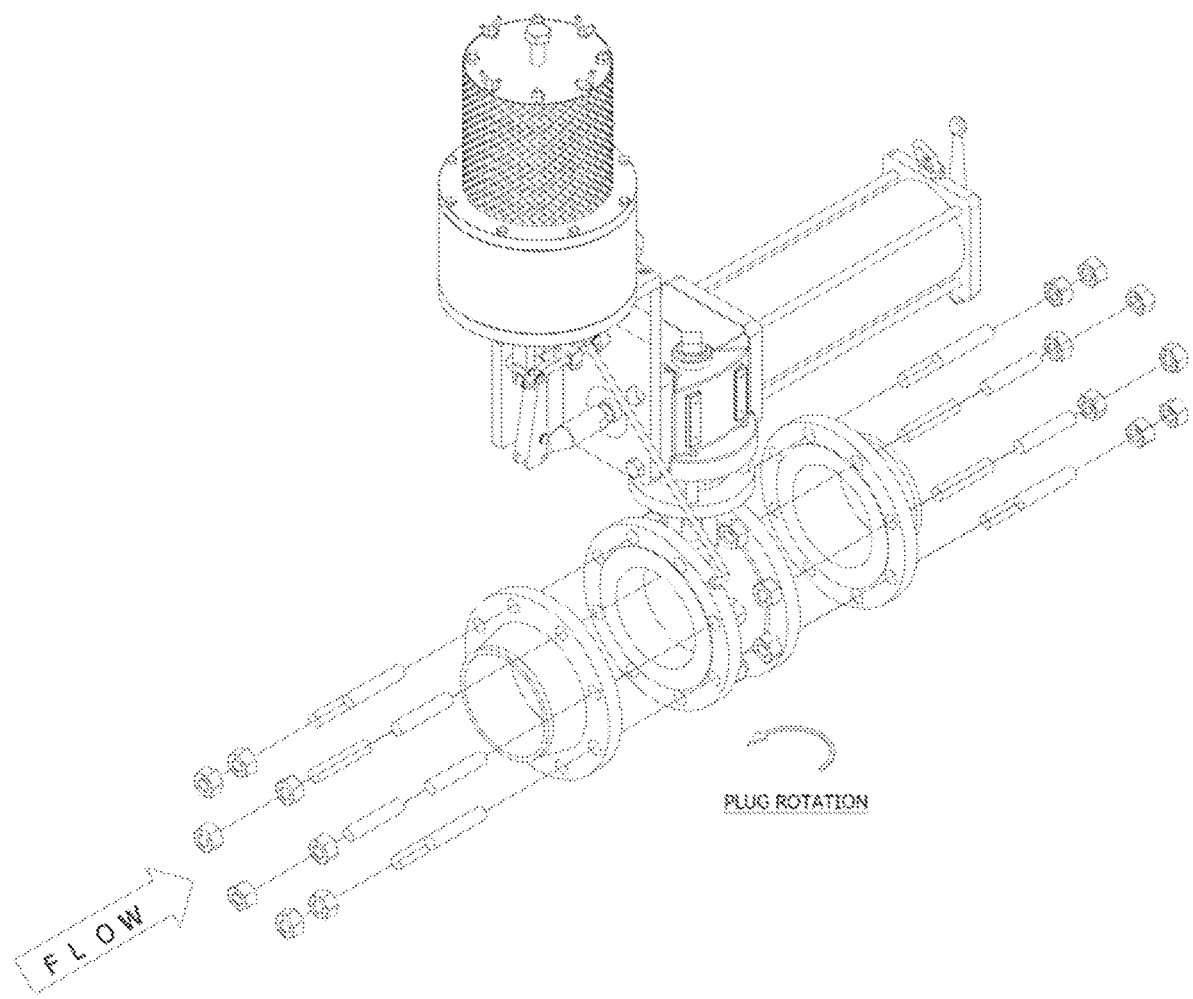
FIG. 31 illustrates an embodiment of a pressure relief device assembly installed between companion flanges.

FIG. 31 illustrates an embodiment of a pressure relief device assembly, showing an exploded view of the installation of the pressure relief device between companion flanges of an inlet pipe and an outlet pipe.

Non-reclosing pressure relief devices, such as those illustrated in FIGS. 1 and 2, are often classified in terms of their flow characteristics, such as "flow resistance factor" (also referred to as "Kr value") when following the ASME Boiler and Pressure Vessel Code Section VIII). In the art, a flow resistance factor is determined experimentally by following ASME PTC 25 testing arrangements and methods, as defined by ASME Section VIII. The determined Kr value may be validated for gas service (designated as "Krg"), liquid service (designated as "Krl"), or both gas and liquid service (designated as "Krgl"). This flow resistance factor is dimensionless and typically determined for a wide range of pressure relief device sizes to aid in the selection of a pressure relief device that provides adequate flow for particular applications. A low flow resistance Kr value is highly desirable, because it indicates very little disturbance of the media flow in a piping system. In one embodiment, a pressure relief device according to the present disclosure may have a flow resistance value of typically less than 25. In other embodiments, the disclosed pressure relief device may have a flow resistance value of less than 20, less than 15, or less than 10, depending upon the specific design of valve used.

The foregoing embodiments are exemplary only. Other embodiments will be apparent to those skilled in the art from consideration of the specification and practice of the disclosure herein.

What is claimed is:

1. A rotatable pressure relief valve assembly, comprising:
   a butterfly valve having an inlet side and an outlet side;
   a spring actuator comprising a compressed spring and a piston, wherein the spring biases the spring to move along an axis and the piston terminates in a terminal end;
   a diaphragm device having a flexible membrane, wherein the flexible membrane creates a pneumatically sealed chamber within the diaphragm device, the diaphragm device further having a latch arm;
   a linkage assembly having a first end and a second end, wherein the first end is configured to engage with the terminal end of the piston, and wherein the second end is configured to engage with the latch arm;
   a pilot tube configured to transmit an inlet fluid pressure from the inlet side of the butterfly valve to the sealed chamber; and,
   a buckling pin mechanism having a buckling pin;
   wherein the diaphragm device is configured to translate the inlet fluid pressure into a compressive force and to transmit the compressive force to the buckling pin; and,
   wherein the latch arm is configured to disengage from the second end of the linkage assembly when the buckling pin has buckled, permitting the piston of the spring actuator to move along the axis along which it is biased by the spring of the spring actuator activating the butterfly valve; and
   wherein the spring actuator is configured to cause the piston to engage with the latch arm along an axis which is at right angles to the direction of the compressive force applied to the buckling pin by the diaphragm device.

2. The rotatable pressure relief valve assembly of claim 1, wherein the terminal end of the piston comprises a roller.

3. The rotatable pressure relief valve assembly of claim 1, wherein the latch arm comprises a cone bushing.

4. The rotatable pressure relief valve assembly of claim 1, wherein the linkage assembly comprises at least one lever arm.

5. The rotatable pressure relief valve assembly of claim 4, wherein the at least one lever arm is provided with at least one roller.

6. The rotatable pressure relief valve assembly of claim 4, wherein the linkage assembly further comprises at least one trigger rod.

* * * * *